US007000182B1

(12) United States Patent
Iremonger et al.

(10) Patent No.: US 7,000,182 B1
(45) Date of Patent: Feb. 14, 2006

(54) ASSISTANT FOR CREATION OF LAYOUTS OR REPORTS FOR DATABASES

(75) Inventors: Stephen Iremonger, Mountain View, CA (US); Jhansi Reddy, Milpitas, CA (US); Tak Tsubota, San Jose, CA (US); Joanna Holsztynska, Sunnyvale, CA (US); Christopher L. Crim, San Jose, CA (US); David Raffarin, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/378,526

(22) Filed: Aug. 20, 1999

(51) Int. Cl.
  *G06F 17/00* (2006.01)
  *G06F 17/21* (2006.01)
(52) U.S. Cl. .................. 715/517; 715/505; 715/506; 715/517; 707/100; 707/101; 707/102; 707/103; 707/104
(58) Field of Classification Search .............. 707/505, 707/506, 507, 517, 100, 101, 102, 103, 104; 715/505, 506, 507, 517
See application file for complete search history.

(56) References Cited

U.S. PATENT DOCUMENTS

| | | | |
|---|---|---|---|
| 5,280,575 A | 1/1994 | Young et al. ................ 715/504 |
| 5,537,546 A * | 7/1996 | Sauter ......................... 709/230 |
| 5,659,742 A | 8/1997 | Beattie et al. ............ 707/104.1 |
| 5,680,617 A * | 10/1997 | Gough et al. ............ 707/104.1 |
| 5,692,181 A * | 11/1997 | Anand et al. ................ 707/102 |
| 5,704,029 A * | 12/1997 | Wright, Jr. ................... 707/505 |
| 5,724,575 A | 3/1998 | Hoover et al. ................. 707/10 |
| 5,758,345 A * | 5/1998 | Wang .......................... 707/100 |
| 5,808,914 A | 9/1998 | Shin et al. ...................... 703/2 |
| 5,832,481 A * | 11/1998 | Sheffield ......................... 707/4 |
| 5,870,768 A * | 2/1999 | Hekmatpour ............. 715/501.1 |
| 5,966,716 A * | 10/1999 | Comer et al. ................ 707/203 |
| 6,055,541 A * | 4/2000 | Solecki et al. ........... 707/103 R |
| 6,163,781 A | 12/2000 | Wess, Jr. ................. 707/103 X |
| 6,189,003 B1 | 2/2001 | Leal ............................... 707/2 |
| 6,192,381 B1 * | 2/2001 | Stiegemeier et al. ......... 715/505 |
| 6,205,453 B1 | 3/2001 | Tucker et al. ................ 715/503 |
| 6,246,610 B1 | 6/2001 | Han et al. .............. 365/185.29 |
| 6,250,930 B1 * | 6/2001 | Mintz .......................... 434/323 |
| 6,292,811 B1 * | 9/2001 | Clancey et al. ............. 707/503 |
| 6,298,347 B1 * | 10/2001 | Wesley ......................... 707/10 |
| 6,327,586 B1 * | 12/2001 | Kisiel ............................ 707/2 |
| 6,411,313 B1 * | 6/2002 | Conlon et al. .............. 345/769 |
| 6,714,928 B1 * | 3/2004 | Calow ........................... 707/4 |

OTHER PUBLICATIONS

O'Connell, sandra E., "Designing Management Reports", May 1991, HR Magazine, pp. 22-23.*

(Continued)

*Primary Examiner*—Sanjiv Shah
*Assistant Examiner*—Almari Yuan
(74) *Attorney, Agent, or Firm*—Beyer Weaver & Thomas, LLP

(57) ABSTRACT

An assistant for the creation of layouts/reports for databases is disclosed. A layout for a database is the arrangement of information for the database such as for data entry or screen viewing, and a report (or report format) for a database is the arrangement of information from the database for presentation of the data in a printed document or with on-line viewing. The assistant serves to automate in the creation of the layout/reports after an interview sequence with a user.

38 Claims, 18 Drawing Sheets

OTHER PUBLICATIONS

Habraken, Joe, "Using Lotus SmartSuite Millennium Edition", Sep. 1998, Que Corporation, pp. 337-340 and pp. 411-425.*

Microsoft Access 97, Report Wizard (screen shots), Mirosoft Corporation, 1996, pp. 1-4.

*Using Quattro Pro 6 for Windows, special Edition*, by Que Corporation, 1994, pp. 22, 156-159, 168-174, 184-215, 414-415, 442-444.

Prague et al., *Microsoft Access 2000 Bible*, published by Hungry Minds, Inc., New York, NY, 1999.

Lotus Approach, Millennium Edition, Exploring Approach, Release 9, Lotus Development corporation, Cambridge, MA, 1998, pp. 6-22 to 6-26.

Meadhra et al., *Lotus Smartsuite for Dummies*, Millennium Edition, Chapter 15, "Putting Your Database on Report", published by IDG Books Worldwide, Inc., Foster City, CA, 1998, pp. 239-252.

* cited by examiner

ASSISTANT FOR CREATION OF LAYOUTS OR REPORTS FOR DATABASES

CROSS-REFERENCE TO RELATED APPLICATION

This application is related to U.S. patent application Ser. No. 09/378,599, filed concurrently herewith, entitled "PROCESS AND SYSTEM FOR PROVIDING A TABLE VIEW OF A FORM LAYOUT FOR A DATABASE", and assigned to the assignee of the present application, and hereby incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to databases and, more particularly, to visual presentation of information stored in databases.

2. Description of the Related Art

Databases are used to store data in a manner that facilitates subsequent use of the data. A database includes one or more files, each of which contains one or more records. A record holds information about a subject or item in various fields of the record. Often database programs provide a user interface that allows a user to view the data in various ways. For example, the visual representations can include browse mode, layout mode, and preview mode. The browse mode allows records to be viewed, changed, sorted, deleted, or added. The layout mode allows one to define how the information of the database is presented on a computer screen or in printed reports. The preview mode allows one to see on a computer screen how data in records, forms or reports will look when printed.

FIGS. 1–3 are representative screen depictions from a conventional database program, namely, FileMaker Pro 4.0 by FileMaker Pro, Inc. of Santa Clara, Calif. The screen depictions pertain to an asset management database having three records. FIG. 1 illustrates a screen depiction of a browse mode for record "1" of the asset management database. The browse mode is suitable for on-line or screen viewing of the records of the asset management database and allows the records to be viewed or deleted. The data in the fields of the record can be changed, sorted, deleted or added in the browse mode. In FIG. 1, the record "1" is viewed as a form but may also be viewed as a list. FIG. 2 illustrates a screen depiction of a preview mode for the asset management database. The preview mode illustrates the asset management database on the computer screen in a manner that it would appear when printed. FIG. 3 illustrates a screen depiction of a layout mode for the asset management database. Typically, a database can have different layouts for different views and different reports. The layout mode depicted in FIG. 3 pertains to a depreciation report to be used with the asset management database.

Hence, with FileMaker Pro 4.0, the report layout, such as shown in FIG. 3, can be designed by a user or software developer to provide the particular type of report the user or developer desires. The layout mode typically provides various controls or tools that enable the user or software developer to design reports. The form view layout can also be designed in a similar manner. One problem is that it has been difficult for users or developers to create sophisticated reports using the layout mode. These difficulties not only frustrate users and hinder user satisfaction but also make the generation of sophisticated reports overly burdensome. As a consequence, the producer of FileMaker Pro 4.0 has experienced a significant number of technical inquiries from users or software developers pertaining to difficulties regarding use of the layout mode to create sophisticated reports.

Accordingly, there is a need for improved ways to provide layouts for reports.

SUMMARY OF THE INVENTION

Broadly speaking, the invention relates to an assistant for the creation of layouts/reports for databases. A layout for a database is the arrangement of information for the database such as for data entry or screen viewing, and a report (or report format) for a database is the arrangement of information from the database for presentation of the data in a printed document or with on-line viewing. The assistant serves to automate in the creation of the layout/reports after an interview sequence with a user.

The invention can be implemented in numerous ways including, as a method, an apparatus, a computer readable medium, and a computer system. Several embodiments of the invention are discussed below.

As a method for creating a report or layout for data stored in a database, one embodiment of the invention includes the acts of: (a) performing an interview sequence to obtain organization information, the organization information including at least a list of fields and at least one summary field for the report or layout, the at least one summary field being associated with one of the fields in the list of fields; and (b) automatically creating the report or layout based on the interview sequence.

As a method for creating a report layout for data stored in a database, another embodiment of the invention includes the acts of: (a) performing an interview sequence to obtain organization information, the organization information including at least a list of fields and at least one summary field for the report layout, the at least one summary field being associated with one of the fields in the list of fields, the report layout including a plurality of parts including a header area, a grand total area, a summary area, a body area, and a footer area; and (b) automatically creating the report layout based on the interview sequence, said creating includes placing the summary field in at least one of the grand total area and the summary area, and placing the fields in the list of fields in the body area.

As a computer readable medium including computer program code for creating a report layout for data stored in a database, one embodiment of the invention includes: computer program code for performing an interview sequence to obtain organization information, the organization information including at least a list of fields and at least one summary field for the report layout, the at least one summary field being associated with one of the fields in the list of fields, the report layout including a plurality of parts including a header area, a grand total area, a summary area, a body area, and a footer area; and computer program code for creating the report layout based on the interview sequence, the creating of the report layout includes placing the summary field in at least one of the grand total area and the summary area and placing the fields in the list of fields in the body area.

The advantages of the invention are numerous. Different embodiments or implementations may yield one or more of the following advantages. One advantage of the invention is that sophisticated layouts/reports are able to be created in an automated manner. Another advantage of the invention is that header and footers, styles, sorts, and summary fields can be provided within the layout/reports. Still another advantage of the invention is that technical service inquiries concerning creation of sophisticated reports can be significantly reduced. Yet another advantage of the invention is that ease of use and user satisfaction are improved.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to an assistant for the creation of layouts/reports for databases. A layout for a database is the arrangement of information for the database such as for data entry or screen viewing, and a report (or report format) for a database is the arrangement of information from the database for presentation of the data in a printed document or with on-line viewing. The assistant serves to automate in the creation of the layout/reports after an interview sequence with a user.

The assistant creates layouts or reports. A report is considered in this application to be a more sophisticated, or complex, layout. A report layout is interchangeable with report.

Embodiments of this aspect the invention are discussed below with reference to FIGS. 4–22. However, those skilled in the art will readily appreciate that the detailed description given herein with respect to these figures is for explanatory purposes as the invention extends beyond these limited embodiments.

Figure 1:
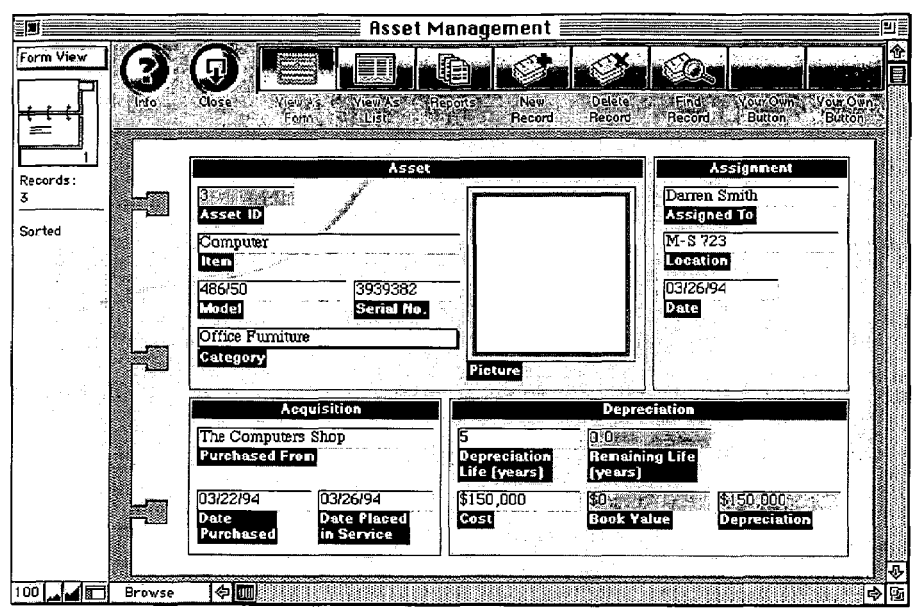
FIGS. 1–3 are representative screen depictions from a conventional database program.
Figure 2:
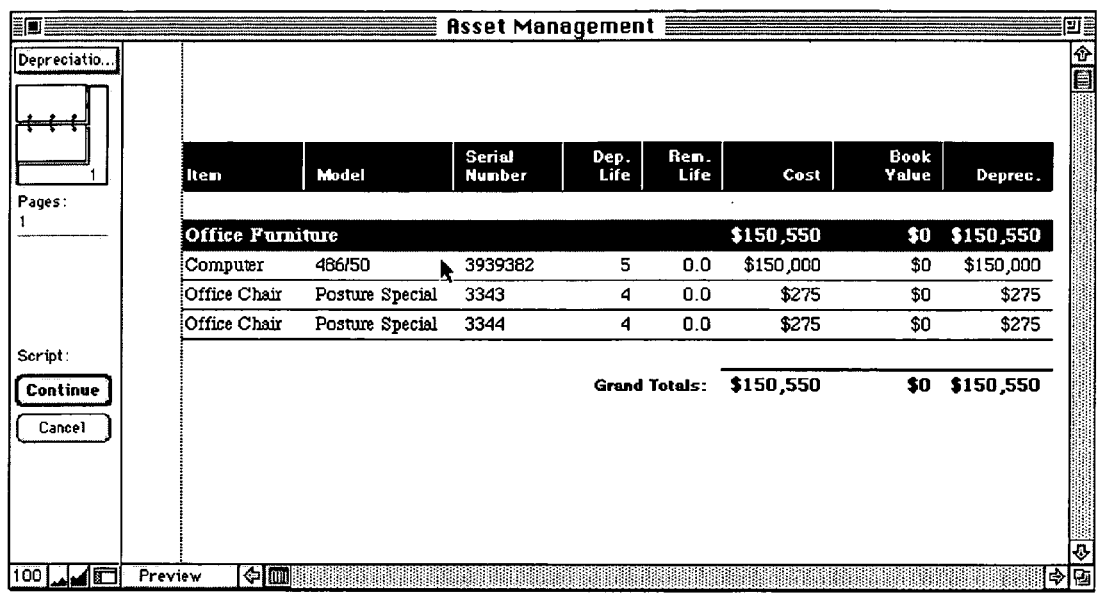
Figure 3:
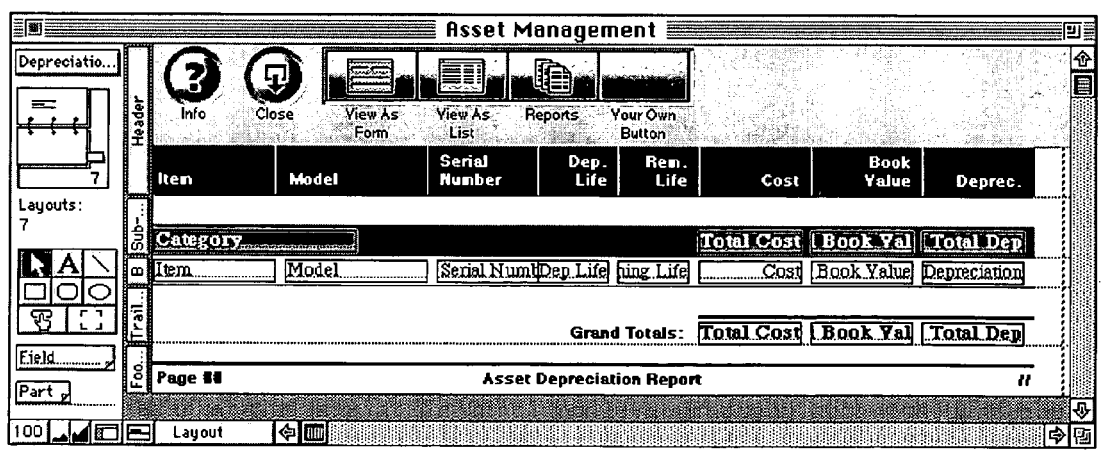
Figure 4:
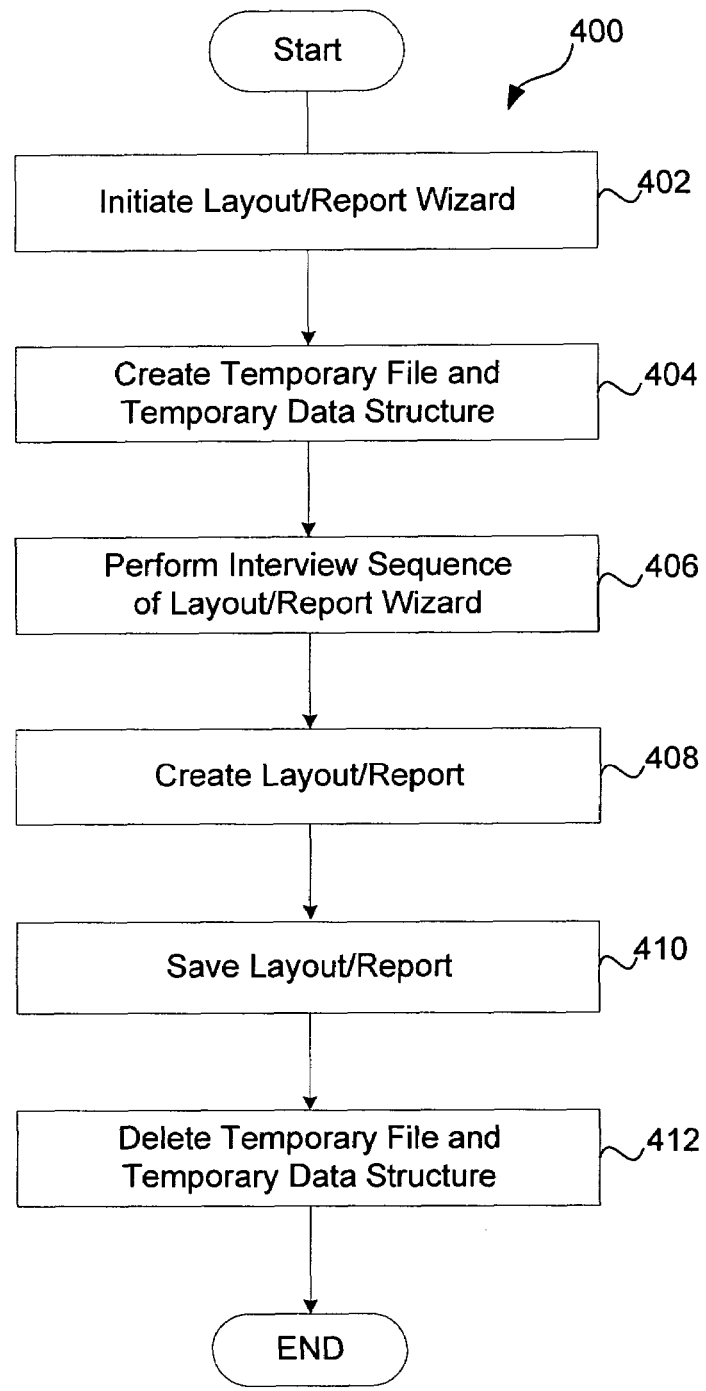
FIG. 4 is a flow diagram of layout/report wizard processing according to one embodiment of the invention.

FIG. 4 is a flow diagram of layout/report wizard processing 400 according to one embodiment of the invention. Once invoked, the layout/report wizard processing 400 initiates 402 a layout/report wizard. Typically, the initiation 402 of the layout/report wizard is done by a user action in selecting an icon or command associated with the layout/report wizard. The icon or command are displayed on a display screen for a computer executing a program including the layout/report wizard. A temporary node in a temporary file and a temporary data structure are then created 404. The temporary node stores fields and parts information and the temporary data structure stores layout/report information from the interview sequence.

Next, an interview sequence of the layout/report wizard is performed 406. The interview sequence operates to interview the user of the layout/report wizard to present the user with various options and selections to be made so as to produce the desired layout or report. FIGS. 8–22, described below, are a series of screen depictions that are associated with a representative example of the interview sequence. During the interview sequence, data is stored to the temporary file and the temporary data structure based on the information obtained from the user during the interview sequence.

After the interview sequence has been performed 406, the layout/report can be created 408. When creating the layout/report, the layout/report wizard processing 400 utilizes the data stored in the temporary file and the temporary data structure. After the layout/report has been created 408, the layout/report is saved 410. Then, the temporary node and the temporary data structure are deleted 412. The layout/report wizard processing 400 is then complete and ends.

The layout/report being created can be organized by layout parts which together form the layout/report. Exemplary layout parts for a layout/report are provided in Table 1 below.

TABLE 1

| LAYOUT PARTS |
| --- |
| Title Header |
| Header |
| Leading Grand Totals |
| Leading Summaries |
| Body |
| Trailing Summaries |
| Trailing Grand Totals |
| Footer |
| Title Footer |

The exemplary layout parts provided in Table 1 include Title Header, Header, Leading Grand Totals, Leading Summaries (or Leading Subsummaries), Body, Trailing Summaries (or Trailing Subsummaries), Trailing Grand Totals, Footer, and Title Footer. The layout/report wizard serves to create and place information or fields in those of the exemplary parts being used by the layout/report. In the embodiment discussed below, the Title Header and the Title Footer are not used but these any of the other layout parts are modifiable by user actions following the operation of the layout/report wizard.

Figure 5A:
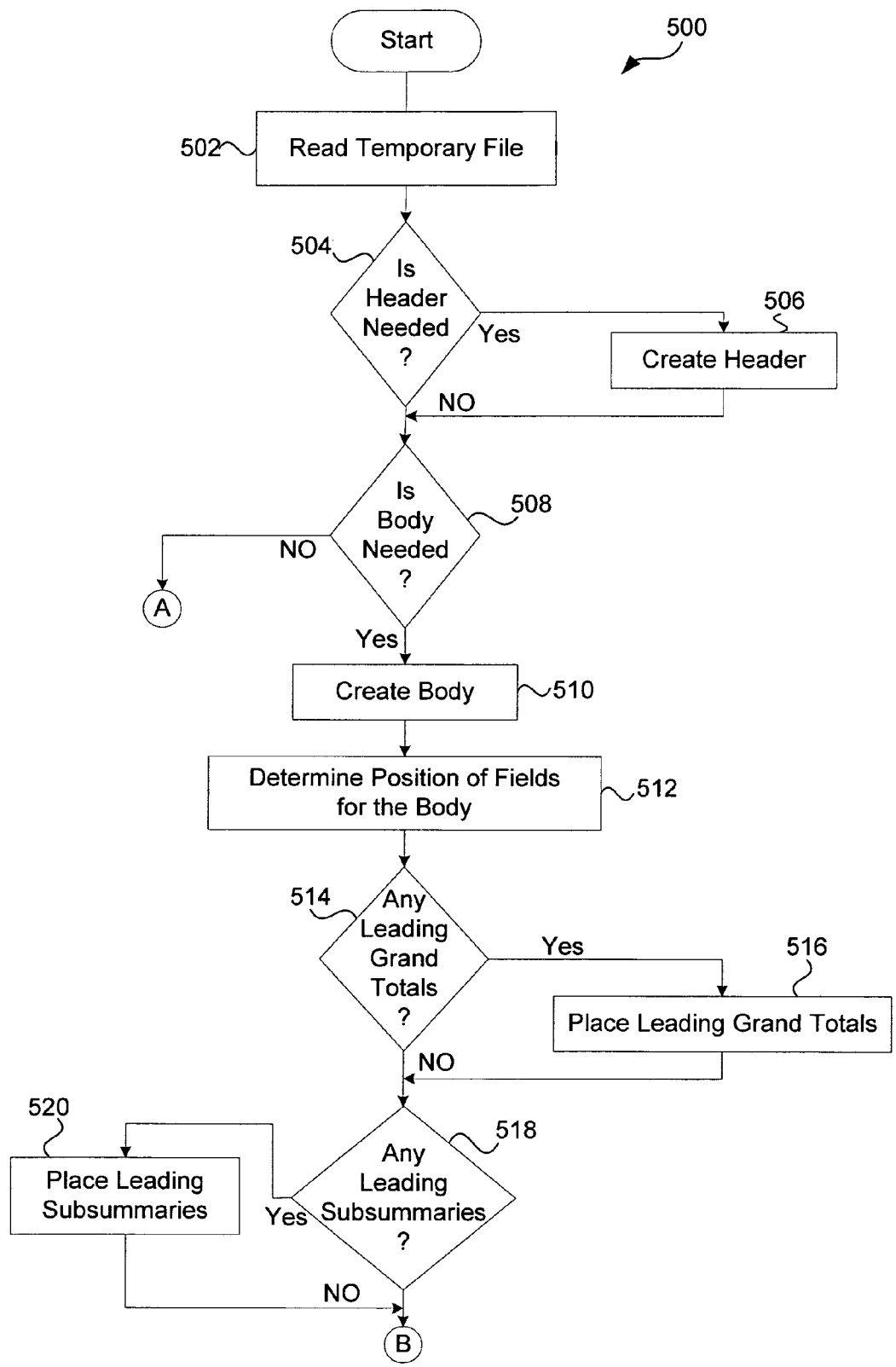
FIGS. 5A and 5B are flow diagrams of create layout/report processing according to one embodiment of the invention.
Figure 5B:
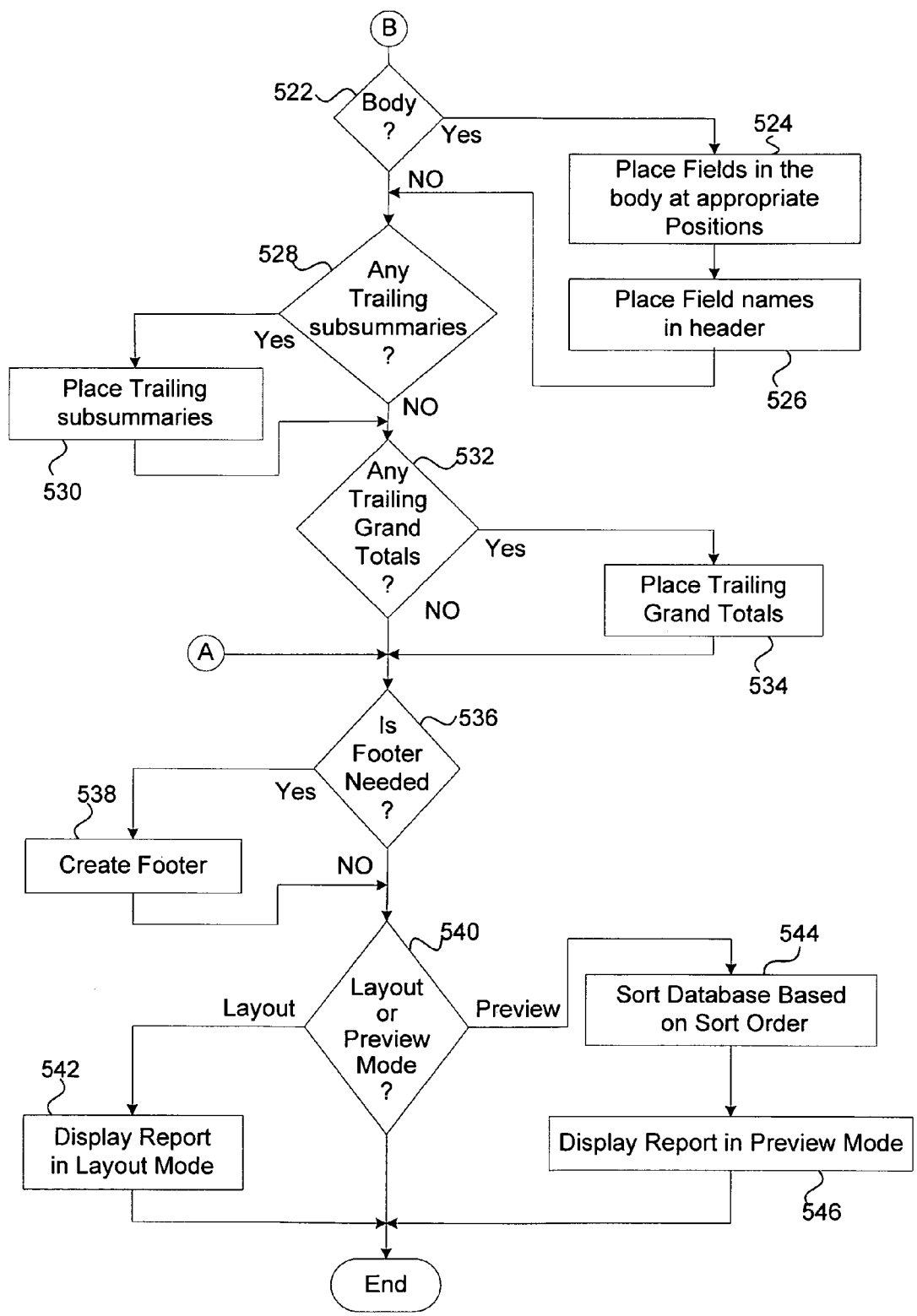

FIGS. 5A and 5B are flow diagrams of create layout/report processing 500 according to one embodiment of the invention. The create layout/report processing 500 is, for example, associated with operations performed by block 408 illustrated in FIG. 4.

The create layout/report processing 500 initially reads 502 the temporary file. As noted above, the layout/report wizard processing 400 creates a temporary file and updates the temporary file in accordance with information obtained from the interview sequence. Similarly, the temporary data structure is created during the layout/report wizard processing 400 and the temporary data structure is likewise updated in accordance with information obtained from the interview sequence. After the temporary file has been read 502, a decision 504 determines whether a header is needed. When the decision 504 determines that a header is needed, then the header is created 506. On the other hand, when the decision 504 determines that a header is not needed, the creation 506 of the header is bypassed.

Following the creation 506 of the header or directly following the decision 504 when a header is not needed, a decision 508 determines whether a body is needed. When the decision 508 determines that a layout/report being created does not include a body, then the body is not needed and the create layout/report processing 500 skips all the processing associated with the body (e.g., blocks 520–534). On the other hand, when the decision 508 determines that the body is needed, then various operations are performed to create the body and provide various components for the body. In particular, when the decision 508 determines that the body is needed, the position of fields for the body are determined 512. Fields are not actually placed within the body at this time, but their positions within the body are determined. The order in which the fields are placed are determined by a specified order for the fields during the interview sequence. For example, in FIG. 11, the user would identify the fields to appear in the layout/report and their order.

A decision 514 then determines whether there are any leading grand totals for the layout/report. When the decision 514 determines that there are leading grand totals, then the leading grand totals are placed 516 in the appropriate leading grand totals layout part. When the decision 514 determines that there are no leading grand totals, the placement 516 of the leading grand totals is bypassed. Following the placement 516 of the leading grand totals or directly following the decision 514, a decision 518 determines whether there are any leading subsummaries. When the decision 518 determines that there are leading subsummaries, the leading subsummaries are placed 520 in the appropriate leading subsummaries layout part. On the other hand, when the decision 518 determines that there are no leading subsummaries, the placement 520 of the subsummaries is bypassed.

Following the placement 520 of the subsummaries or directly following the decision 518, a decision 522 determines whether the layout/report includes the body. When the layout/report does include a body, then the fields are placed 524 in the body at appropriate positions. The appropriate positions were determined in block 512 above. After the fields are placed 524 in the body, the field names are place 526 in the header. The field names are placed 526 in the appropriate locations such that they are associated with the corresponding fields in the body. Typically, a field is placed in a column location of a report, and the field name would then be placed in the same column location typically above the data for the field. When the decision 522 determines that the layout/report does not include a body, the placement 524 of the fields in the body and the placement 526 of the field names are bypassed.

Following the placement 526 of the field names or directly following the decision 522 when the layout/report does not include a body, a decision 528 determines if there are any trailing subsummaries. When the decision 528 determines that there are trailing subsummaries, then trailing subsummaries are placed 530 in the appropriate trailing subsummaries layout part. When the decision 528 determines that there are no trailing subsummaries, the placement 530 of the trailing subsummaries is bypassed.

Following the placement 530 of the trailing subsummaries or directly following the decision 528, a decision 532 determines whether there are any trailing grand totals. When the decision 532 determines that there are trailing grand totals, then the trailing grand totals are placed 534 in the appropriate trailing grand totals layout part. Following the placement 534 of the trailing grand totals or directly following the decision 532, a decision 536 determines whether a footer is needed. When the decision 536 determines that a footer is needed, the footer is created 538. On the other hand, when the decision 536 determines that no footers are needed, the creation 538 of the footers is bypassed.

Following the creation 538 of the footer or directly following the decision 536 when the footer is not needed, a decision 540 determines whether a layout mode or a preview mode has been selected. When the decision 540 determines that a layout mode has been selected, then the layout/report is displayed 542 in a layout mode. Alternatively, when the decision 540 determines that the preview mode has been selected, the database is sorted 544 based on the sort order. By sorting the database, the data provided within the report is updated and displayed in its appropriate order. Then, the report can be displayed 546 in the preview mode. Following blocks 542 and 546, the create layout/report processing 500 is complete and ends.

Figure 5C:
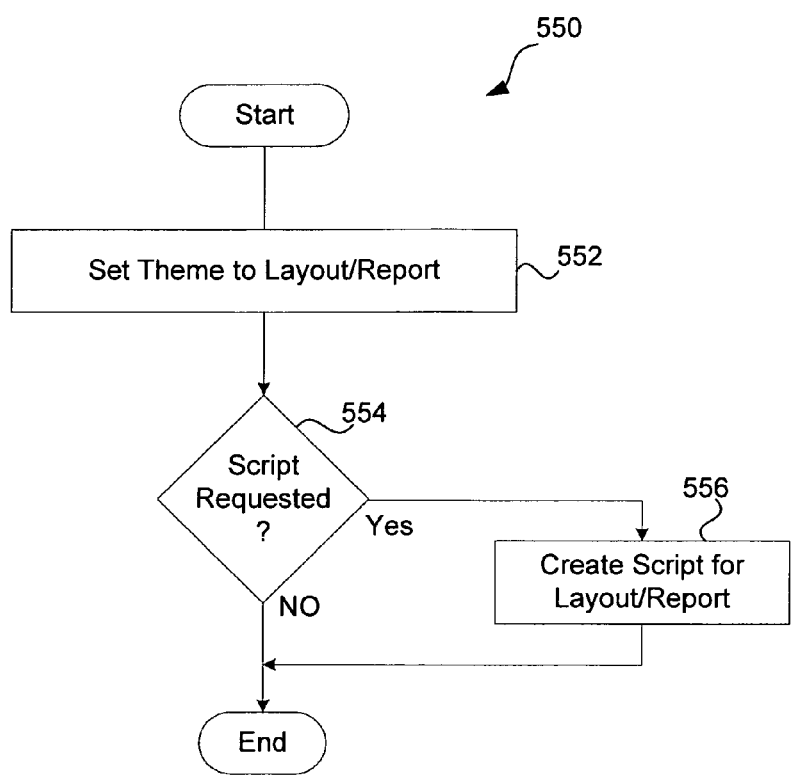
FIG. 5C is a flow diagram of layout/report enhancement processing according to one embodiment of the invention.

FIG. 5C is a flow diagram of layout/report enhancement processing 550 according to one embodiment of the invention. The layout/report enhancement processing 550 pertain to additional operations that the create layout/report processing 500 could perform. Namely, a theme for the layout/report can be set 552. The theme, or style, for the report/layout operates to cause text size, text color, text font, text style, and background color to be changed in accordance with the theme. The theme can also alter effects of the layout/report (e.g., text or fields), such as embossing, engraving, or shadowing. Selection of a theme is done during the interview sequence and is much more efficient that individually selecting color and fonts for the various components of a layout/report. The layout/report enhancement processing 550 can also automatically create a script for the layout/report during its creation so that the layout/report can be easily initiated for subsequent data sets to be placed in the layout/report. In particular, a decision 554 determines whether a script is requested. When the decision 554 determines that a script is requested, then the script is created 556 for the layout/report. On the other hand, when the decision 554 determines that a script is not requested, the block 556 is bypassed. The layout/report enhancement processing 550 is thereafter complete and ends.

Figure 6:
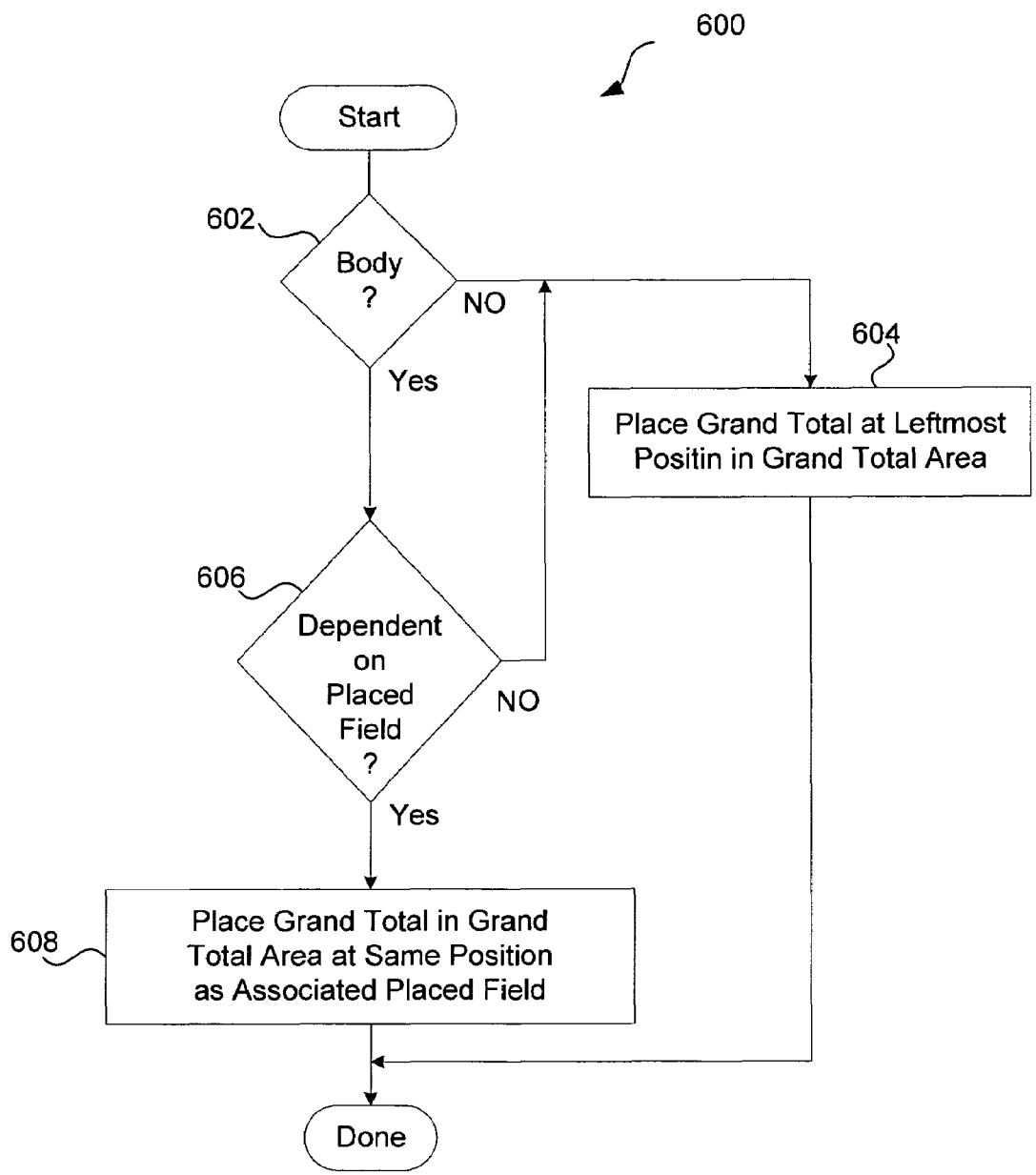
FIG. 6 is a flow diagram of grand total processing according to one embodiment of the invention.

FIG. 6 is a flow diagram of grand total processing 600 according to one embodiment of the invention. The grand total processing 600 is, for example, processing that can be performed to place either leading grand totals or trailing grand totals such as performed in blocks 516 and 534 of the create layout/report processing 500 illustrated in FIGS. 5A and 5B.

The grand total processing 600 begins with a decision 602 that determines whether a body is present in the layout/report. When the decision 602 determines that a body is not present, then the grand total can be placed 604 at the leftmost position in the grand total area. Typically, at the very leftmost position, there may be break fields for labels, images, or other content. Break fields are associated with categories (see FIG. 12), and for example, identify the categories to be sort the data on. Hence, the placement 604 of the grand total at the leftmost position need not be at the very left position of the layout/report. The grand total is placed 604 in the grand total area which is a reserved section or part of the layout/report. If, for example, there is no body part, then the grand total will be placed in the same column location as the same field which was previously placed when the same field was previously placed. The grand total area, for example, is either the leading grand total part or the trailing grand total part. After the placement 604 of the grand total, the grand total processing 600 is complete and ends.

Alternatively, when the decision 602 determines that a body is present in the layout/report, then a decision 606 determines whether the grand total to be placed is dependent on a field to be placed (e.g., in the body). When the decision 606 determines that the grand total is not dependent on a field to be placed, then the grand total processing 600 places the grand total in accordance with block 604. On the other hand, when the decision 606 determines that the grand total to be placed is dependent on a field to be placed, then the grand total is placed 608 in the grand total area at the same position as the associated previously placed field. For example, if a grand total operates to total the field "sales", and the grand total is paced such that it is aligned (e.g., in the same column) with the sales field which was previously placed. Following block 608, the grand total processing 600 is complete and ends.

Figure 7:
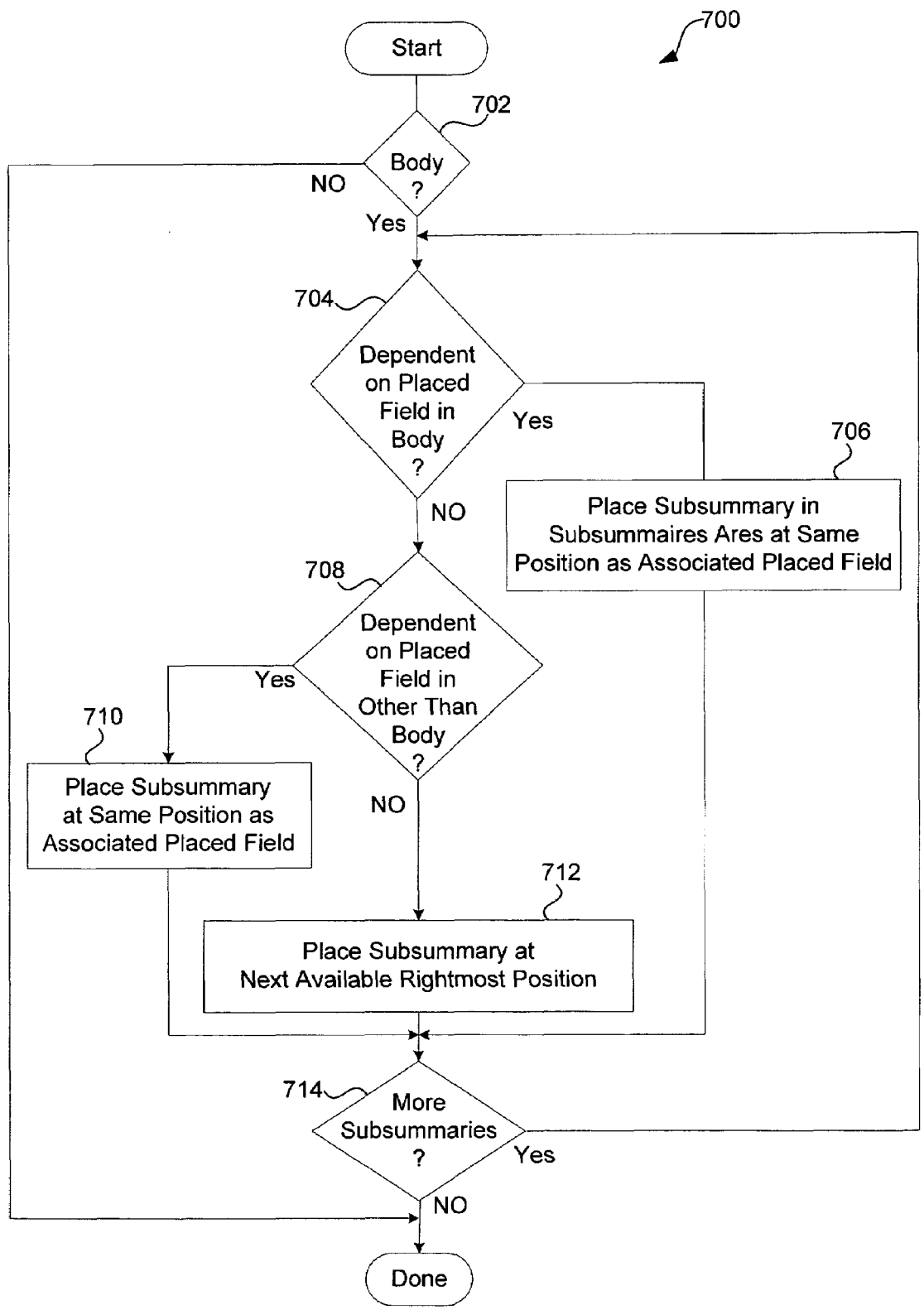
FIG. 7 is a flow diagram of subsummaries processing according to one embodiment of the invention.

FIG. 7 is a flow diagram of subsummaries processing 700 according to one embodiment of the invention. The subsummaries processing 700 is, for example, the processing performed when placing the leading or trailing subsummaries within the layout/report being produced by the layout/report wizard. More particularly, the subsummaries processing 700 is processing performed during the block 520 and 530 of the create layout/report processing 500 illustrated in FIGS. 5A and 5B.

The subsummaries processing 700 begins with a decision 702 that determines whether a body (e.g., a body part) is present in the layout/report. When the decision 702 determines that the layout/report does not include a body, then the subsummary (i.e., summary field) is placed 703 (i) at the same position as a previously placed like subsummary, or (ii) at the next available rightmost position if there is no previously placed like subsummary.

Alternatively, when the decision 702 determines that the layout/report does include a body, a decision 704 determines whether the subsummary (i.e., summary field) is dependent on a previously placed, or to be placed, field in the body. When the decision 704 determines that the subsummary is dependent on a previously placed, or to be placed, field in the body, then the subsummary is placed 706 in the subsummaries area (i.e., subsummaries layout part) at the same position as the associated previously placed, or to be placed, field. For example, the subsummary will be placed in the same column as the associated previously placed field but in the subsummaries area. The subsummaries area is a reserved section or part of the layout/report. The subsummaries area, for example, is either the leading summaries part or the trailing summaries part.

On the other hand, when the decision 704 determines that the subsummary is not dependent on a previously placed, or to be placed, field in the body, then a decision 708 determines whether the subsummary is dependent on a previously placed field in an area (e.g., part) other than the body. For example, the previously placed field could be in the leading grand total or leading summary or trailing summary layout parts. When the decision 708 determines that the subsummary is dependent on a previously placed field in an area other than the body, the subsummary is placed 710 at the same position as the associated previously placed field. For example, the subsummary will be placed in the same column as the associated previously placed field but in the subsummaries area. Alternatively, when the decision 708 determines that the subsummary is not dependent on a previously placed field in an area other than the body, the subsummary is placed 712 at the next available rightmost position.

Following blocks 703, 706, 710 and 712, a decision 714 determines whether there are more subsummaries to be placed. When the decision 714 determines that there are more subsummaries to be placed, the subsummaries processing 700 returns to repeat the decision 704 and subsequent blocks so that other of the subsummaries can be processed. However, when the decision 714 determines that there are no more subsummaries to be processed, the subsummary processing 700 is complete and ends.

FIGS. 8–22 are a series of screen depictions that are associated with a representative example of the interview sequence according to one implementation of the invention. During the interview sequence, data is stored to the temporary file and the temporary data structure based on the information obtained from the user during the interview sequence.

Figure 8:
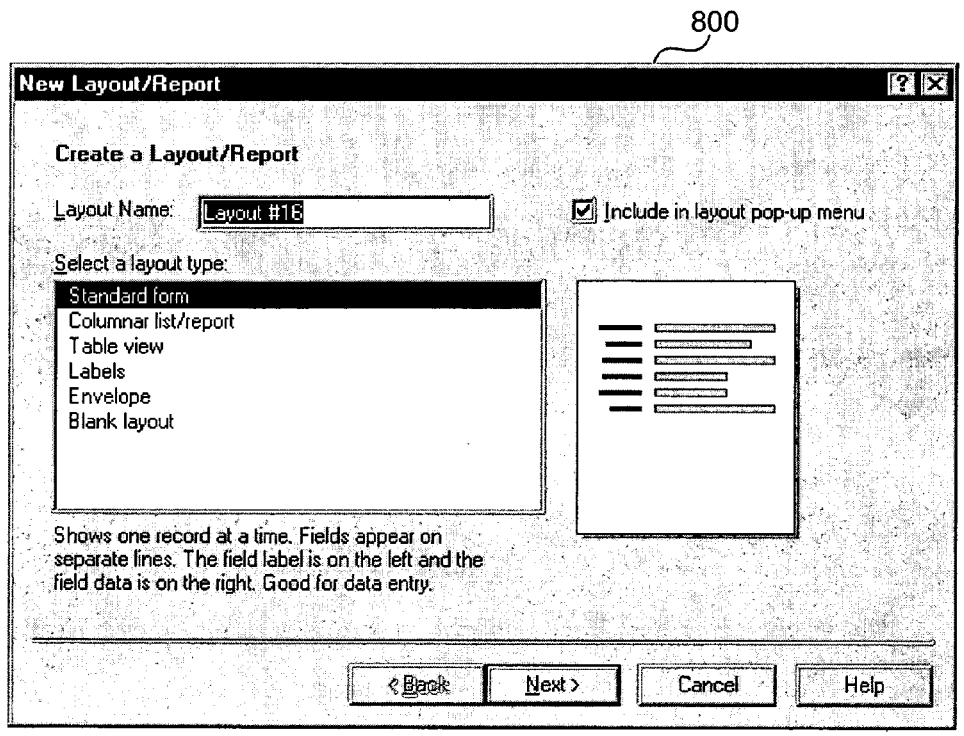
FIGS. 8–22 are a series of screen depictions that are associated with a representative example of an interview sequence according to an embodiment of the invention.

FIG. 8 is a screen depiction of a screen 800 in which a user selects a layout type and provides a layout name for the layout/report to be produced by the layout/report wizard. As shown in FIG. 8, the available layout types include: Standard Form, Columnar Lists/Report, Table View, Labels, Envelope, and Blank Layout. The discussion of the subsequent screen depictions in FIGS. 9–22 assumes that the user has selected to create a Columnar List/Report type of layout. The Columnar List/Report type of layout is considered a report, whereas the other layout types are considered layouts. Again, a report is considered to be a more sophisticated, or complex, layout. Hence, all the available layout types can be considered layouts. Since the subsequent screen depictions pertain to the Columnar List/Report type of layout, the layout/report wizard is mainly described as producing a report.

Figure 9:
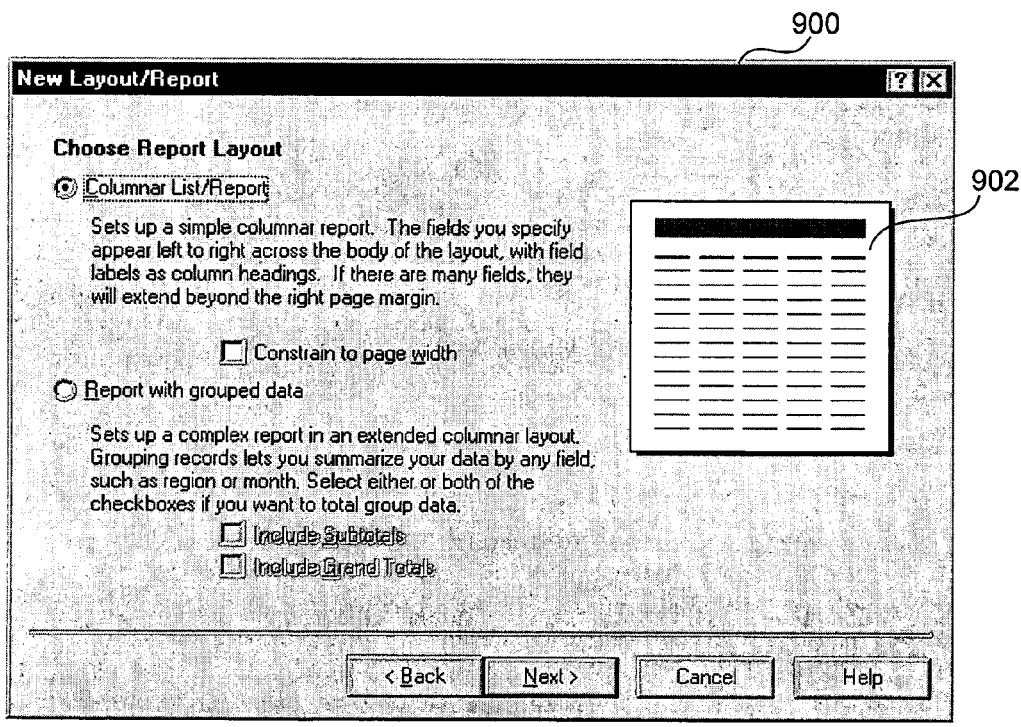

FIG. 9 illustrates a screen depiction of a screen 900 in which a report layout is chosen. The screen 900 follows after the screen 800 in the interview sequence. In the screen 900, a user can select, via radio buttons, either a Columnar List/Report or a Report with Grouped Data. The Columnar List/Report selection is used to create a basic columnar report. The Report with Grouped Data selection is used to create a complex report in an extended columnar layout. When the Report with Grouped Data selection is chosen, check boxes allow the inclusion of subtotals or grand totals within the complex report having the extended columnar layout that is to be created. The discussion of the subsequent screen depictions (FIGS. 10–22) assumes that the user has selected to create the Report with Grouped Data with both subtotals and grand totals. Given that this is the most complicated of the reports that be created, it in effect also describes other reports.

Figure 10A:
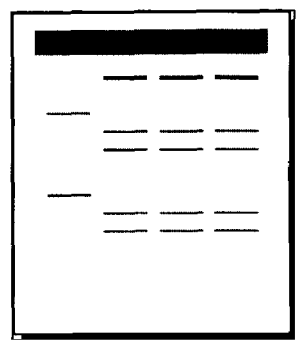
Figure 10B:
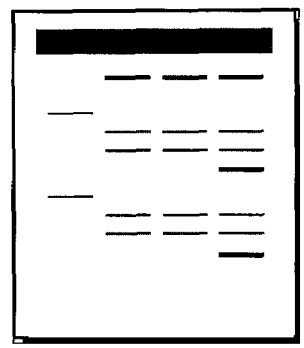
Figure 10C:
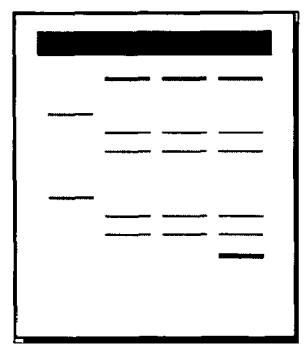
Figure 10D:
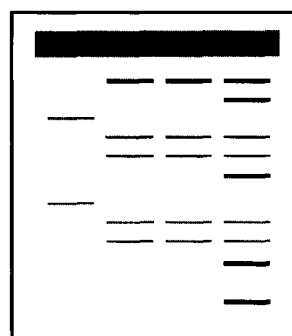

FIGS. 10A–10D are representative layout arrangements for the chosen report. In the screen 900, the illustrated representative layout arrangement in window 902 is a Columnar List/Report which extends beyond the page margins. This illustrated representative layout arrangement in the window 902, however, changes as different one of the radio buttons or check boxes are selected in the screen 900. In other words, the window 902 in the screen 900 could alternatively include any of the layout arrangements shown in FIGS. 10A–10D. FIG. 10A is a representative layout arrangement for a report with grouped data without any subtotals or grand totals. FIG. 10B is a representative layout arrangement for a report with grouped data with subtotals. FIG. 10C is a representative layout arrangement for a report with grouped data with grand totals. FIG. 10D is a representative layout arrangement for a report with grouped data with subtotals and grand totals.

Figure 11:
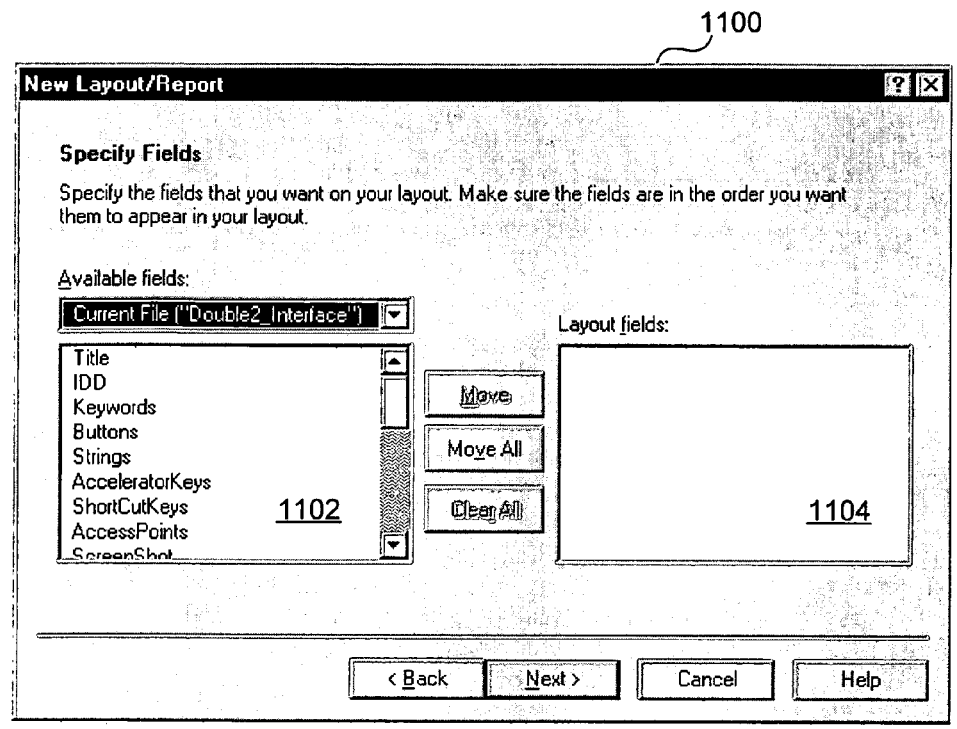

FIG. 11 is a screen depiction of a screen 1100 in which fields for the layout/report are specified. The screen 1100 follows after the screen 900 in the interview sequence. The available fields within a selected database file are displayed in a list box 1102. For example, in FIG. 11, the available fields within the list box 1102 are associated with Graphical User Interface (GUI) components and include: Title, IDD, Keywords, Buttons, Strings, AcceleratorKeys, ShortCut-Keys, AccessPoints, ScreenShot, etc. A user can interact with the screen 1100 to select those of the available fields desirous of being layout fields for the layout/report. The selected one of the available fields then become the layout fields which are displayed in FIG. 11. The order in which the fields are placed or selected is the order in which they will appear in the layout/report.

Figure 12:
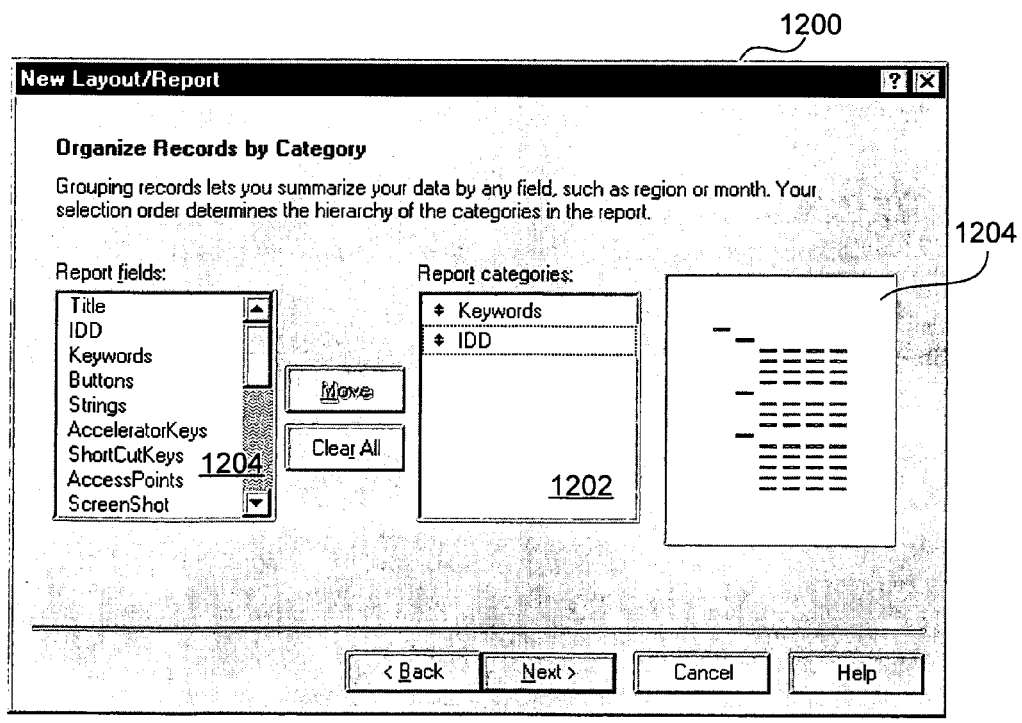
Figure 13A:
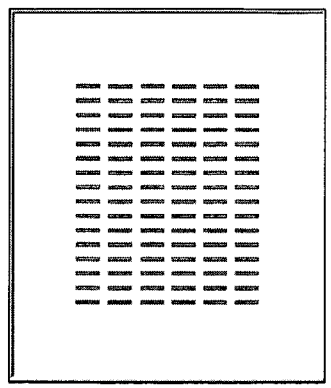
Figure 13B:
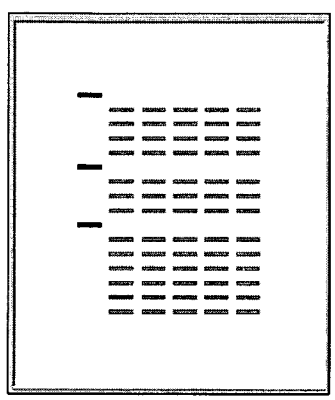
Figure 13C:
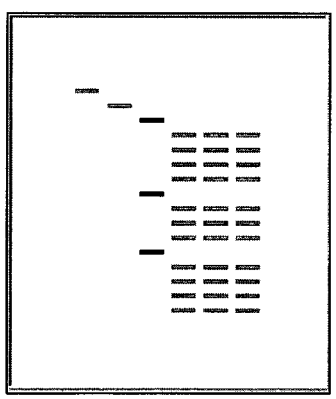
Figure 13D:
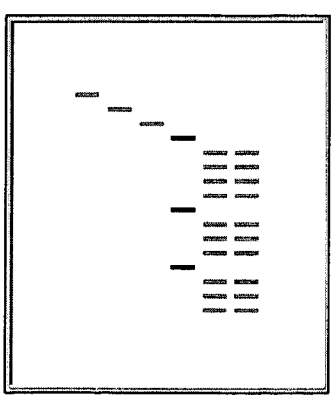

FIG. 12 is a screen depiction of a screen 1200 in which the organization of the report can be categorized (or grouped) by single category or hierarchy of categories. In particular, a user can select from the listed available report fields in a list box 1102 to indicate a report category. The available report fields are those fields that were selected in the screen 1100 illustrated in FIG. 11. In the screen 1200, the user has selected two of the report fields, Keywords and IDD, as report categories as shown in categories window 1204, and thus the layout for the report is depicted in the window 1204 as having two categories arranged in a hierarchy. More generally, the report organization is shown in the window 1204 based on the number of categories selected (e.g., up to six levels of categories). FIGS. 13A–13D are depictions of arrangements of the layout for the report in accordance with the hierarchy of categories selected. The report organization provided in the window 1204 also changes as different number of report categories are selected (window 1202). In FIG. 13A there is no hierarchy or categories selected and, thus, no organization in accordance with categories. In FIG. 13B the arrangement of the layout is in accordance with the single category. In FIG. 13C the arrangement of the layout is in accordance with a hierarchy of three categories. In FIG. 13D the arrangement of the layout is in accordance with a hierarchy of four categories.

Figure 14:
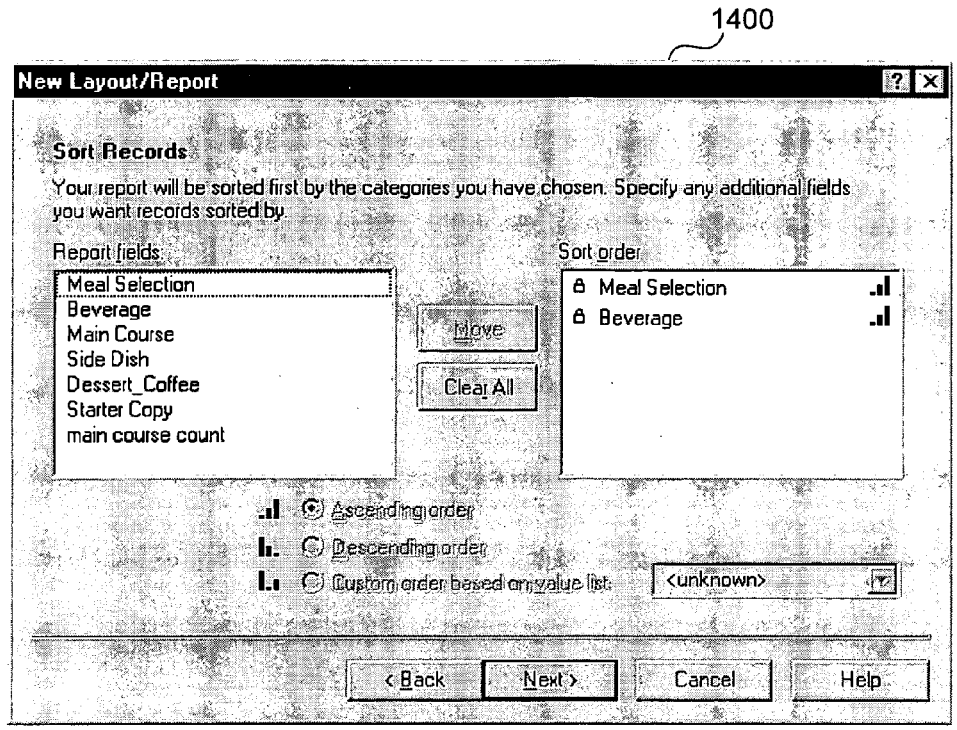

FIG. 14 is a screen depiction of a screen 1400 in which one or more fields on which records are to be sorted can be selected. The screen 1400 can follow after the screen 1200 in the interview sequence. Although the report will be initially sorted by the categories chosen with respect the screen 1200 illustrated in FIG. 12, additional fields (layout fields) on which records are to be sorted can also be selected using the screen 1400. In this example, the database being considered has to do with meal service instead of the GUI components as are utilized in other of the screen depictions. In addition, the screen 1400 allows the user to select whether the sort for the additional fields should be performed in accordance with an ascending order, a descending order, or a custom order based on a value list.

Figure 15:
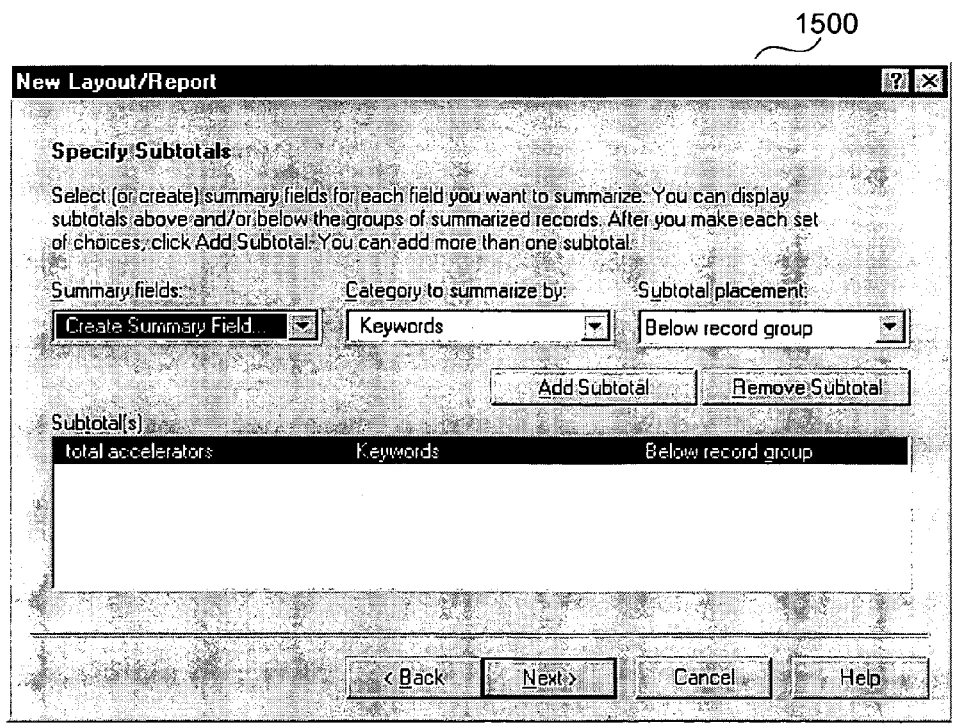

FIG. 15 is a screen depiction of a screen 1500 in which a user can setup subtotals for the report. The screen 1500 can follow after the screen 1400 in the interview sequence. Using the screen 1500, a user can select an existing summary field or create a new summary field for each field to be summarized. A new summary field can be created using the "Create Summary Field" item in the summary field list. These summary fields perform a mathematical operation to yield a subtotal. The screen 1500 also permits selection of a category to summarize and/or the placement of the subtotal either above or below the records being grouped.

Figure 16:
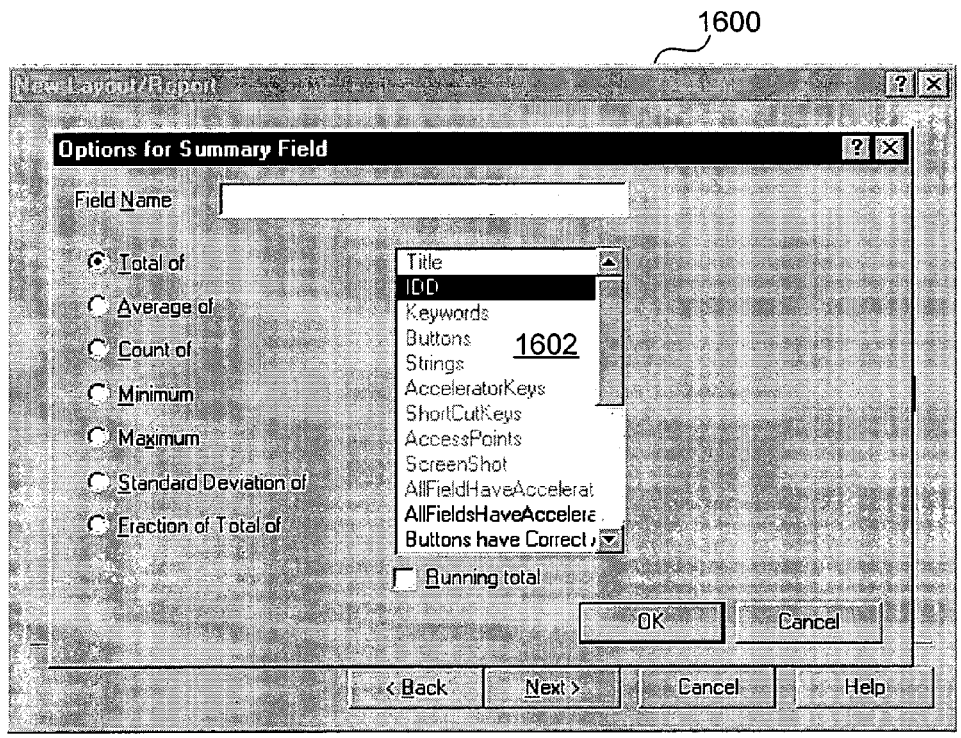

FIG. 16 is a screen depiction of the screen 1600 that corresponds to the creation of a summary field. In other words, when the user selects the "Create Summary Field" item in the summary field list of the screen 1500 illustrated in FIG. 15, the screen 1600 is presented. A user then selects from the fields of the current database that are listed in a list box 1602, provides a name for the summary field, and indicates the type of summary operation being provided. The summary operations shown in the screen 1600 include: Total, Average, Count, Minimum, Maximum, Standard deviation, or Fraction of the Total. The total operation is used to create a summary field that serves to total the data for the selected field. The average operation is used to create a summary field that serves to average the data for the selected field. The count operation is used to create a summary field that serves to count the data for the selected field (e.g., counts the number of records in a set of records that contain data in the dependent field). The minimum operation is used to create a summary field that serves to return the minimum value found in the data for the selected field. The maximum operation is used to create a summary field that serves to return the maximum value found in the data for the selected field. The standard deviation operation is used to create a summary field that returns the standard deviation of the data for the selected field. The Fraction of the Total is used to create a summary field that returns the fraction of a total of the data for the selected field and an additional field. Only those of the fields in the list box 1602 that are appropriate for the selected summary operation are shown as active and able to be selected (i.e., inactive fields are not able to be selected). For example, only number, date and time fields can be totaled, whereas all fields can be counted.

Figure 17:
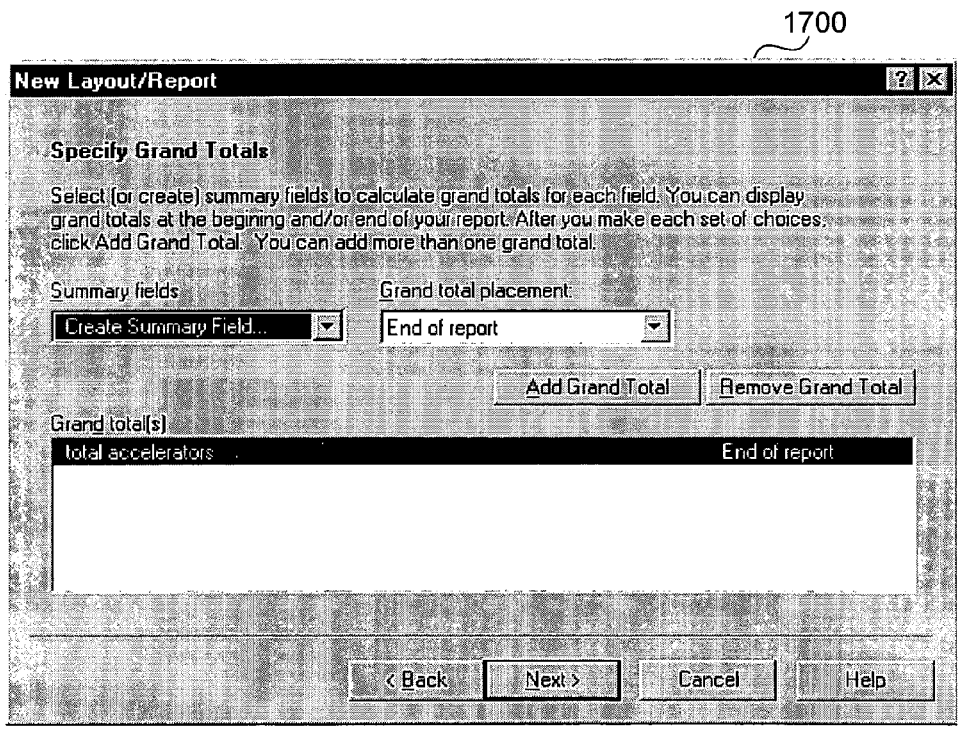

FIG. 17 is a screen depiction of a screen 1700 in which grand totals can be specified. The screen 1400 can, for example, follow after the screen 1400 or 1500(1600) in the interview sequence. Like the screen 1500 illustrated in FIG. 15, the screen 1700 allows the user to select and position summary fields. Here, by placement in the grand totals area, the summary fields are used to calculate grand totals for the summary fields. These grand totals can be displayed at the beginning and/or the end of the report (i.e., leading grand totals layout part or trailing grand totals layout part). In FIG. 17, the screen 1700 shows that the user has requested one grand total for the total accelerators summary field and that the grand total is to be placed at the end of the report.

Figure 18:
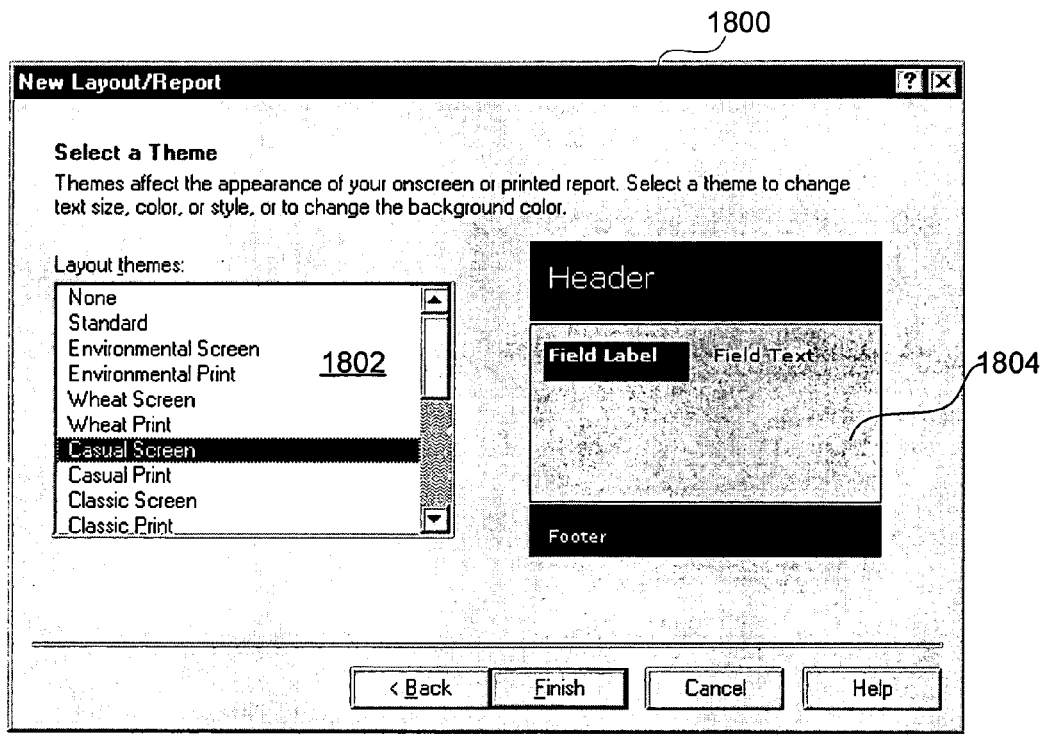

FIG. 18 is a screen depiction of a screen 1800 in which a theme for the report can be selected. The screen 1800 can, for example, be flexibly placed in the interview sequence. The theme, or style, for the report operates to cause text size, text color and background color to be changed in accordance with the theme. A list box 1802 includes the theme options for the report. The list box in the screen 1800 includes the theme options of: None (default), Standard, Environmental Screen, Environmental Print, Wheat Screen, Wheat Print, Casual Screen, Casual Print, Classic Screen, Classic Print, etc. Some of the themes can be optimized for on-screen results and others can be optimized for printed results. A user simply selects one of the themes and the report take on the attributes (e.g., colors, fonts, sizes) of the theme. As a different theme is selected, the sample style image in window 1804 is updated to reflect the selected theme.

Figure 19:
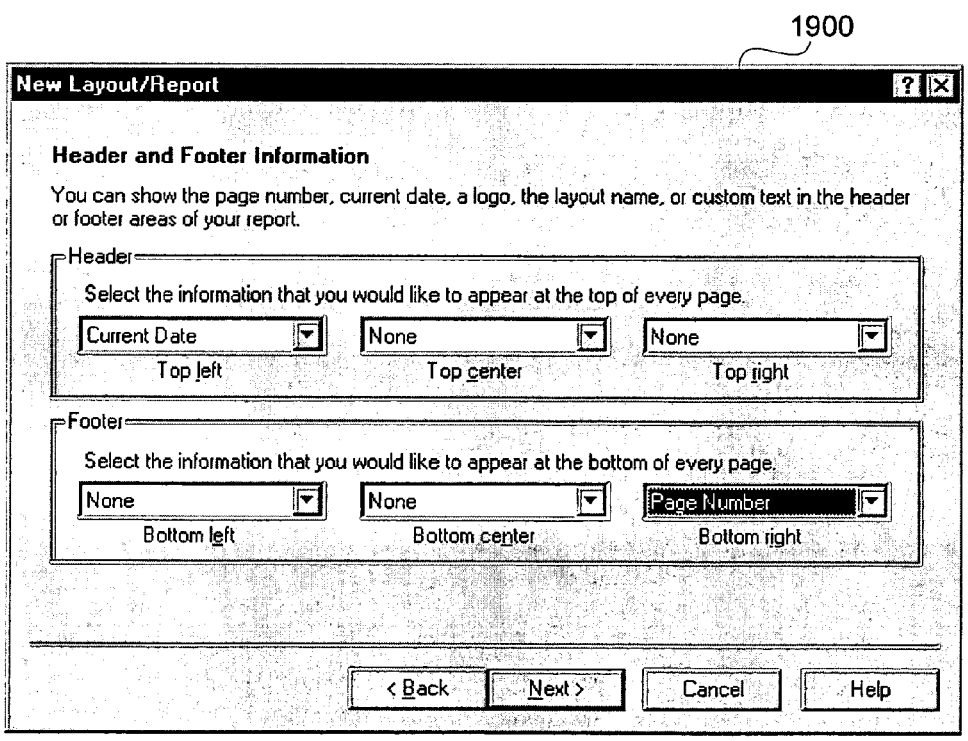
Figure 20:
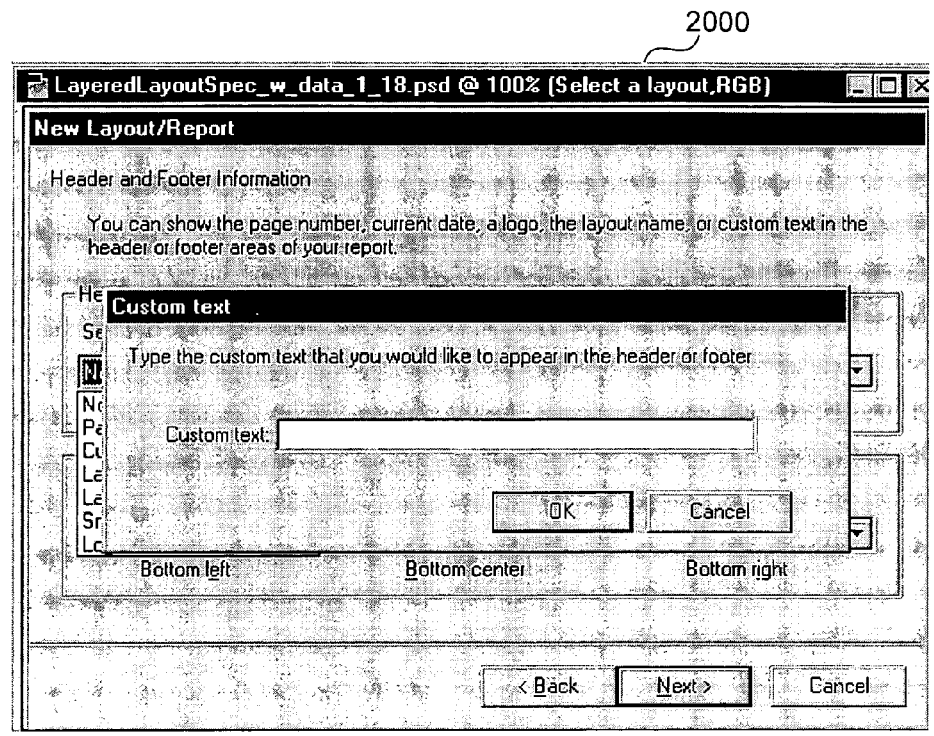

FIG. 19 is a screen depiction of a screen 1900 in which header and footer information can be established. The screen 1900 can, for example, be flexibly placed in the interview sequence. For example, the header or footer information can include page number, current date, a logo, the layout/report name, or custom text. Upon selecting any of the pop-up menus for the header or footer at any of left, center or right positions, a menu of items available for selection is displayed. In one implementation, the menu of items includes page number, current date, layout name, large custom text, small custom text, and logo. The screen 1900 illustrates user selections such that (i) the Current Date is to be provided in the top left position of the header and (ii) the Page Number is to be provided in the bottom right position of the footer. If the large or small custom text menu items are selected, a custom text dialog is opened. FIG. 20 is a screen depiction of a screen 2000 in which a custom text dialog is opened over the screen 1900. The custom text dialog allows a user to enter the particular custom text that will appear in the header or footer.

Figure 21:
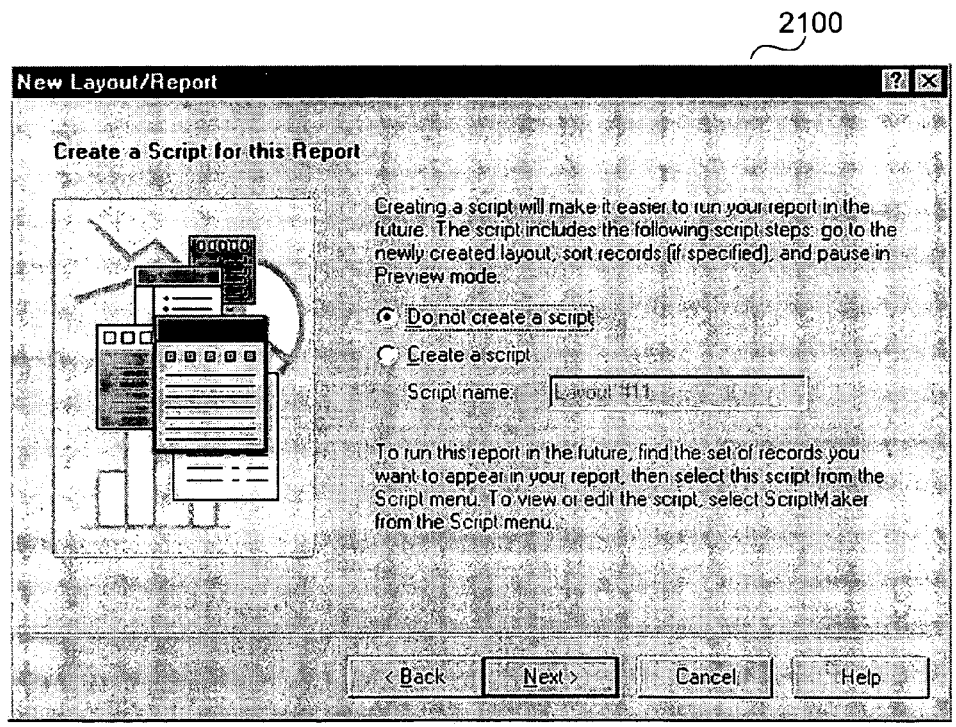

FIG. 21 is a screen depiction of a screen 2100 in which a script can requested during the interview sequence. In other words, a script can be automatically created by the layout/report assistant during the creation of the report. The screen 2100 can, for example, be flexibly placed in the interview sequence. By establishing a script for the report, the report is easier to run in the future because it will automatically be produced when the script is executed. In the case of a report such as the Columnar List/Report, the script can serve to properly sort the data in accordance with the report and provide proper totals. Hence, to subsequently use the script, the user would identify the set of records to appear in a report and then select the associated script for execution to thus produce the report. Hence, the data is not only placed in the desired report format but also sorted and suitably totaled. The script is created by a script engine Application Programming Interface (API) based on the user selections to the interview session and based on the particular type of layout being created.

Figure 22:
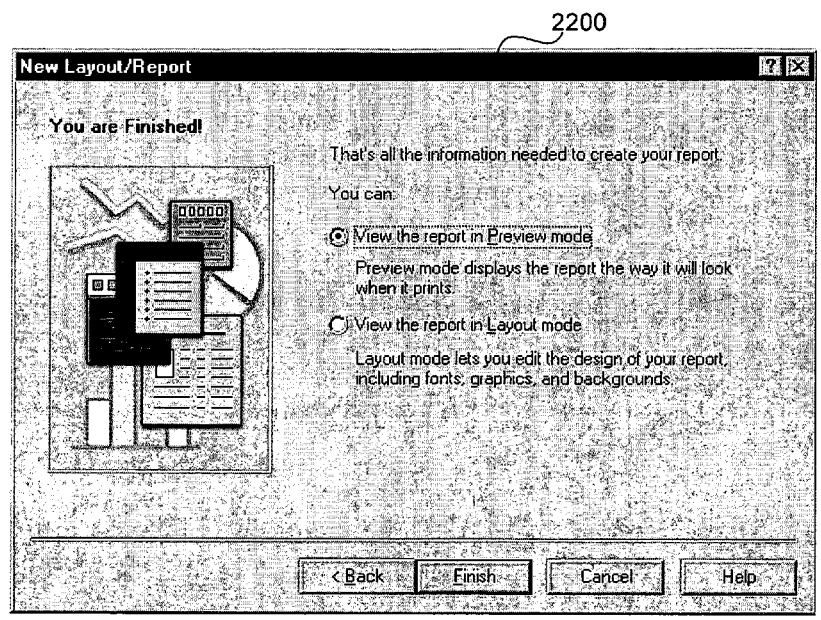

FIG. 22 is a screen depiction of a screen 2200 in which a user has completed the interview session. At the screen 2200, the user completes the creation of the report by selecting the mode to return to after the creation of the report. The screen 220 allows the user to return to either the preview mode or the layout mode. The preview mode displays the report as it will look when it is printed, and the layout mode allows the user the edit the design of the report to make further modifications or enhancements.

In general, the interview session associated with the Columnar List/Report is much more sophisticated than the interview session utilized for any of the Standard Form, The Table View, Labels, Envelopes or Blank Layout. For example, in creating a label layout, the user would be presented with a screen in which standard label measurements or custom label measurements can be selected, and then another screen would be presented to allow the user to build a label by selecting fields of the current database or type in additional text to be utilized for the content of the labels. The creation of an envelop layout is similar. Following the interview session, the layout for the labels or envelopes would allow the user to return to either the preview mode or the layout mode. In the case where a table view layout is being created, following the interview session, the user is allowed to return to either the browse mode or the layout mode.

Figure 23:
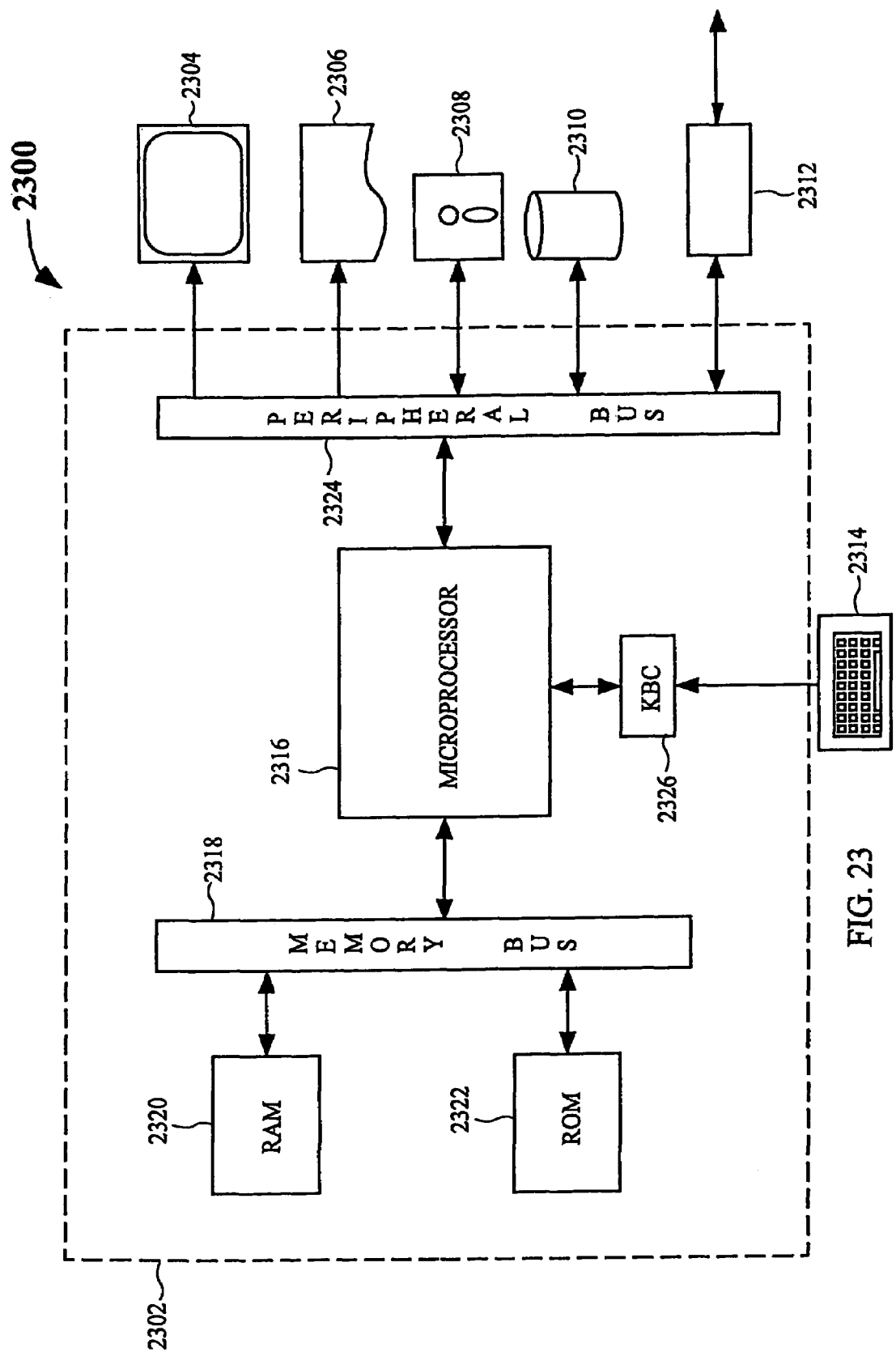
FIG. 23 is a block diagram of an exemplary computer system suitable for use with the invention.

FIG. 23 is a block diagram of an exemplary computer system 2300 suitable for use with the invention. The computer system 2300 includes a digital computer 2302, a display screen (computer screen or monitor) 2304, a PC CARD slot 2306, a floppy disk drive 2308, a hard disk drive 2310, media bay(s) 2312, and a keyboard 2314. The digital computer 2302 includes a microprocessor 2316, a memory bus 2318, random access memory (RAM) 2320, read-only memory (ROM) 2322, a peripheral bus 2324, and a keyboard controller 2326. The digital computer 2302 can be a personal computer, a workstation computer, or some other type of computer.

The microprocessor 2316 is a general purpose digital processor which controls the operation of the computer system 2300. The microprocessor 2316 can be a single-chip processor or can be implemented with multiple components. Using instructions retrieved from memory, the microprocessor 2316 controls the reception and manipulation of input data and the output and display of data on output devices. According to the invention, as described above, some particular functions of the microprocessor 2316 are to present an interview sequence on the display screen 2304, create a report/layout for a database in accordance with the results of the interview sequence, and produce reports from the report layout.

The memory bus 2318 is used by the microprocessor 2316 to access the RAM 2320 and the ROM 2322. The RAM 2320 is used by the microprocessor 2316 as a general storage area and as scratch-pad memory. The ROM 2322 can be used to store instructions or program code followed by the microprocessor 2316 as well as other data.

The peripheral bus 2324 is used to access the input, output, and storage devices used by the digital computer 2302. In the described embodiment, these devices include the display screen 2304, the PC CARD slot 2306, the floppy disk drive 2308, the hard disk drive 2310, and the media bay(s) 2312. The keyboard controller 2326 is used to receive input from the keyboard 2314 and send decoded symbols for each pressed key to the microprocessor 2316.

The display screen 2304 is an output device that displays images of data provided by the microprocessor 2316 via the peripheral bus 2324 or provided by other components in the computer system 2300. The PC CARD slot 606 is a slot that is externally accessible (such as a slot on a housing of a portable computer) such that a PC CARD device can be inserted into the slot to provide the computer system with the additional resources available from the PC CARD device. The PC CARD device can also thereafter be removed from the slot of the computer system 2300. Examples of types of PC CARD devices include a modem, additional memory, a network adapter, and processing hardware.

The floppy disk drive 2308 and the hard disk drive 2310 can be used to store various types of data. The floppy disk drive 2308 facilitates transporting such data to other computer systems, and hard disk drive 2310 permits fast access to large amounts of stored data. The hard disk drive can, for example, store a database that is associated with the layout/reports.

The microprocessor 2316 together with an operating system operate to execute computer code and produce and use data. The computer code and data may reside on the RAM 2320, the ROM 2322, or the hard disk drive 2320. The computer code and data could also reside on a removable program medium and loaded or installed onto the computer system 2300 when needed. Removable program mediums include, for example, CD-ROM, PC-CARD, floppy disk, magnetic tape, and a network component.

The one or more media bays (expansion bays) 2312 are used to receive media bay devices (expansion bay devices) to provide greater resources to the computer system. As examples, the types of devices include a floppy drive, a hard drive, a CD-ROM drive, a DVD drive, or a battery. The media bays are accessible from external to the computer system so that media bay devices can easily be inserted into the media bays or removed from the media bays. The removability of the media bay devices allows a few media bays to support a variety of different types of devices in a flexible manner.

The keyboard 2314 is used by a user to input commands and other instructions to the computer system 2300. Other types of user input devices can also be used in conjunction with the present invention. For example, pointing devices such as a computer mouse, a track ball, a stylus, or a tablet can be used to manipulate a pointer on a screen of a general-purpose computer.

The invention can use a combination of hardware and software components. The software can be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices. The computer readable medium can also be distributed over a network coupled computer system so that the computer readable code is stored and executed in a distributed fashion.

The advantages of the invention are numerous. Different embodiments or implementations may yield one or more of the following advantages. One advantage of the invention is that sophisticated layouts/reports are able to be created in an automated manner. Another advantage of the invention is that header and footers, styles, sorts, and summary fields can be provided within the layout/reports. Still another advantage of the invention is that technical service inquiries concerning creation of sophisticated reports can be significantly reduced. Yet another advantage of the invention is that ease of use and user satisfaction are improved.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for creating a report or layout for data stored in a database, said method comprising:
    (a) performing an interview sequence, by a database program, to obtain organization information associated with the database, the organization information including at least a list of fields defined for the database and at least one summary field for the report or layout, the at least one summary field being associated with at least one of the fields in the list of field, wherein the database program is capable of accessing the data stored in the database, and wherein the interview sequence comprises determining whether a script should be generated for the report or layout; and
    (b) automatically creating, by the database program, the report or layout based on the organization information obtained by the database program through the interview sequence, wherein the database program operates to automatically create the report or layout; and
    (c) automatically generating the script by the database program when it is determined during the interview sequence that the script should be generated, wherein the script when executed allows another report or layout to be automatically generated based on the interview sequence.

2. A method as recited in claim 1, wherein the summary field is a subtotal or a grand total of the data in the associated fields.

3. A method as recited in claim 2, wherein the summary field provides one of a total, count, average, minimum, and maximum of the data for the field associated with the summary field.

4. A method as recited in claim 2, wherein the list of fields is an ordered list or fields.

5. A method as recited in claim 2, wherein the organization information further includes a style for the layout or report.

6. A method as recited in claim 1, wherein the organization information further includes a style for the layout or report.

7. A method as recited in claim 6, wherein the style for the layout or report identifies particular characteristics for the layout or report including a plurality of background color, text size, text font, text style, and other colors.

8. A method as recited in claim 1, wherein the organization information further includes header or footer information for the layout or report, the header or footer information including at least one of a logo and custom text.

9. A method as recited in claim 1,
    wherein said method produces a report, and
    wherein the organization information further includes a category that identifies the field on which the report is organized.

10. A method as recited in claim 9, wherein the organization information further includes a plurality of categories that are ordered, and the categories identify the fields and a hierarchy on which the report is organized.

11. A method as recited in claim 10, wherein the summary field is a subtotal or a grand total of the data in the associated fields.

12. A method as recited in claim 11, wherein the summary field provides one of a total, count, average, minimum, and maximum of the data for the field associated with the summary field.

13. A method as recited in claim 1, wherein the organization information further includes sort fields for the report or layout.

14. A method as recited in claim 1, wherein the report or layout has a plurality of parts, the parts including header, grand total, summary, body, and footer.

15. A method as recited in claim 1, wherein the interview sequence further comprises:
    determining during the interview sequence whether one or more of: a leading grand total, a leading sub-summary, a trailing sub-summary, and a trailing grand total should be generated for the layout or report; and
    generating one or more of: the leading grand total, the leading sub-summary, the trailing sub-summary and the trailing grand total when it is determined during the interview that one or more of: the leading grand total, the leading sub-summary, and the trailing grand total, the trailing sub-summary should be generated.

16. A method as recited in claim 1,
wherein the interview sequence further comprises: determining during the interview sequence whether a leading grand total, a leading sub-summary, a trailing sub-summary, and a trailing grand total should be generated for the layout or report; and
generating the leading grand total only when it is determined during the interview sequence that the leading grand total should be generated;
generating the leading sub-summary only when it is determined during the interview sequence that the leading sub-summary should be generated;
generating the trailing sub-summary only when it is determined during the interview sequence that the trailing sub-summary should be generated; and
generating trailing grand total only when it is determined during the interview sequence that the trailing grand total should be generated.

17. A method as recited in claim 16, wherein said method further comprises:
determining based on the interview sequence whether the report or layout should include a body;
placing the grand total in a leftmost position in a grand total area when the determining determines that report or layout should not include a body;
determining based on said interview whether the grand total to be placed is dependent on a field to be placed in the report or layout;
placing the grand total in a grand total area based on the placement of the field to be placed when the determining determines that grand total to be placed is dependent on a field to be placed; and
placing the grand total in a leftmost position in a grand total area in the report or layout when said determining determines that that grand total to be placed is not dependent on a field to be placed.

18. A method as recited in claim 17, wherein said method further comprises:
determining based on the interview sequence whether placement of a leading or trailing sub-summary is dependent on a field that is to be placed in the body of the report or layout only when the determining determines based on said interview that the report or layout should include a body; and
placing the leading or trailing sub-summary in a sub-summary area in the report or layout based on the placement of the field that is to be placed in the body when said determining determines based on the interview sequence that the placement of the leading or trailing sub-summary is dependent on a field that is to be placed in the body.

19. A method as recited in claim 18, wherein said method further comprises:
determining based on the interview sequence whether placement of a leading or trailing sub-summary is dependent on a field that is to be placed in a position other than the body only when the determining determines based on said interview that the report or layout should include a body; and
placing the leading or trailing sub-summary in a sub-summary area in the report or layout based on the placement of the field that is to be placed in a position other than the body in the report or layout when said determining determines based on the interview sequence that the placement of the leading or trailing sub-summary is dependent on a field that is to be placed in the body.

20. A method for creating a report layout for data stored in a database, said method comprising:
(a) performing an interview sequence, by a database program, to obtain organization information, the organization information including at least a list of fields and at least one summary field for the report layout, the at least one summary field being associated with one of the fields in the list of fields, the report layout including a plurality of parts including a header area, a grand total area, a summary area, a body area, and a footer area, wherein the database program is capable of accessing the data stored in the database, and wherein the interview sequence comprises determining whether a script should be generated for the report or layout; and
(b) automatically creating the report layout based on the interview sequence, said creating includes placing the summary field in at least one of the grand total area and the summary area, and placing the fields in the list of fields in the body area and;
(c) automatically generating the script when it is determined during the interview sequence that the script should be generated, wherein the script when executed allows another report or layout to be automatically generated based the interview sequence.

21. A method as recited in claim 20, wherein when the summary field is a subtotal, said creating (b) places the subtotal in the summary area.

22. A method as recited in claim 21, wherein the subtotal in placed in the summary area at a position corresponding to the position as the associated one of the fields placed in the body.

23. A method as recited in claim 20, wherein the subtotal is placed in the summary area in the same column location in the report layout as the one of the fields placed in the body that corresponds thereto.

24. A method as recited in claim 20, wherein when the summary field is a grand total summary field, said creating (b) places the grand total in the grand total area.

25. A method as recited in claim 24, wherein the grand total summary field is placed in the grand total area at a position corresponding to the position as the associated one of the fields placed in the body.

26. A method as recited in claim 24, wherein the grand total summary field is placed in the grand total area in the same column location in the report layout as the one of the fields placed in the body that corresponds thereto.

27. A method as recited in claim 20, wherein the organization information further includes sort fields for the report or layout.

28. A method as recited in claim 27, wherein said method further comprises:
(c) producing a report for the data using the report layout.

29. A method as recited in claim 28, wherein said producing (c) sorts the data in accordance with the sort fields for the report.

30. A method as recited in claim 20, wherein the organization information further includes a theme selection for the report layout.

31. A method as recited in claim 20, wherein the organizational information includes at least first and second of summary fields, the first summary field is a grand total summary field and the second summary field is summary field, and
wherein said creating (b) of the report layout comprises:
(b1) placing the first summary field in the grand total area;
(b2) placing the second summary field in the summaries area; and
(b3) placing the fields in the list of fields in the body area.

32. A computer readable medium including computer program code for a database program that is capable of creating a report layout for data stored in a database, said computer readable medium comprising:

computer program code for performing an interview sequence to obtain organization information, the organization information including at least a list of fields, the report layout including a plurality of parts including a header area, a grand total area, a summary area, a body area, and a footer area, wherein the database program is capable of accessing the data stored in the database, and wherein the interview sequence comprises determining whether a script should be generated for the report or layout;

computer program code for creating the report layout based on the interview sequence, the creating of the report layout includes placing the fields in the list of fields in the body area; and computer program code for automatically generating the script when it is determined during the interview sequence that the script should be generated, wherein the script when executed allows another report or layout to be automatically generated based the interview sequence.

33. A computer readable medium as recited in claim 32, wherein the organization information further includes header or footer information for the layout or report, the header or footer information including at least one of a logo and custom text.

34. A computer readable medium as recited in claim 32, wherein the organization information further includes a category that identifies the field on which the report layout is organized.

35. A computer readable medium as recited in claim 32, wherein the organization information further includes a plurality of categories that are ordered, and the categories identify the fields and a hierarchy on which the report layout is organized.

36. A computer readable medium as recited in claim 32, wherein the organizational information further includes at least one summary field for the report layout, the at least one summary field being associated with one of the fields in the list of fields, and wherein said computer program code for creating the report layout comprises: computer program code for placing the summary field in at least one of the grand total area and the summary area and placing the fields in the list of fields in the body area.

37. A computer readable medium as recited in claim 36, wherein the summary field is a subtotal or a grand total of the data in the associated fields.

38. A computer readable medium as recited in claim 37, wherein the summary field provides one of a total, count, average, minimum, and maximum of the data for the field associated with the summary field.

* * * * *

UNITED STATES PATENT AND TRADEMARK OFFICE
CERTIFICATE OF CORRECTION

| | | |
|---|---|---|
| PATENT NO. | : 7,000,182 B1 | |
| APPLICATION NO. | : 09/378526 | |
| DATED | : February 14, 2006 | |
| INVENTOR(S) | : Iremonger et al. | |

It is certified that error appears in the above-identified patent and that said Letters Patent is hereby corrected as shown below:

In the Title Page:

In section (73) Assignee, change "Sun Microsystems, Inc., Santa Clara, CA (US)" to --Apple Computer, Inc., Cupertino, CA (US)--.

Signed and Sealed this

Sixteenth Day of March, 2010

David J. Kappos
*Director of the United States Patent and Trademark Office*